United States Patent
Jain et al.

(10) Patent No.: US 10,291,545 B2
(45) Date of Patent: May 14, 2019

(54) METHOD AND APPARATUS FOR SETTING COMMUNICATING SESSION

(71) Applicant: SAMSUNG ELECTRONICS CO., LTD., Suwon-si (KR)

(72) Inventors: Arihant Jain, Noida (IN); Ashutosh Kumar Singh, Noida (IN); Himanshu Gupta, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 437 days.

(21) Appl. No.: 14/962,096

(22) Filed: Dec. 8, 2015

(65) Prior Publication Data
US 2016/0164801 A1 Jun. 9, 2016

(30) Foreign Application Priority Data

Dec. 8, 2014 (IN) .......................... 3587/DEL/2014
Nov. 23, 2015 (KR) ........................ 10-2015-0163984

(51) Int. Cl.
*H04L 29/06* (2006.01)
*H04L 12/26* (2006.01)
*H04L 12/927* (2013.01)

(52) U.S. Cl.
CPC ........ *H04L 47/803* (2013.01); *H04L 43/0894* (2013.01); *H04L 65/1069* (2013.01); *H04L 65/4084* (2013.01)

(58) Field of Classification Search
CPC ........... H04W 72/04–72/085; H04W 72/1242; H04W 76/02–76/025; H04L 41/0896; H04L 45/125; H04L 45/24; H04L 47/10; H04L 47/12; H04L 47/522; H04L 65/4084; H04L 47/70; H04L 47/76; H04L 47/805–47/807; H04L 12/40065

See application file for complete search history.

(56) References Cited

U.S. PATENT DOCUMENTS

| | | | |
|---|---|---|---|
| 5,974,496 A * | 10/1999 | Miller | H04Q 11/0478 709/250 |
| 6,930,984 B1 * | 8/2005 | Nomura | H04L 12/24 370/254 |
| 7,562,145 B2 | 7/2009 | Aiken, Jr. et al. | |
| 7,886,048 B1 * | 2/2011 | Holland | H04L 67/22 704/277 |
| 8,176,364 B1 | 5/2012 | Havemose | |
| 8,611,317 B2 * | 12/2013 | Banerjea | H04W 76/025 370/328 |

(Continued)

*Primary Examiner* — Wing F Chan
*Assistant Examiner* — Rajeshwari Krishnan
(74) *Attorney, Agent, or Firm* — Sughrue Mion, PLLC

(57) ABSTRACT

A method of setting a communicating session for executing an application includes determining an available bandwidth of each of a plurality of communicating sessions connected to a first device; determining a required bandwidth that is used to execute each of a plurality of applications that are executed on the first device; allocating at least one communicating session of the plurality of communicating sessions to at least one application of the plurality of applications, based on strengths of the respective available bandwidths of the plurality of communicating sessions and strengths of the respective required bandwidths of the plurality of applications; and executing the at least one application using the allocated at least one communicating session.

19 Claims, 17 Drawing Sheets

(56) References Cited

U.S. PATENT DOCUMENTS

| | | | |
|---|---|---|---|
| 9,455,927 B1* | 9/2016 | Nayak | H04L 47/522 |
| 2004/0242219 A1* | 12/2004 | Oie | H04L 47/10 |
| | | | 455/422.1 |
| 2007/0263616 A1* | 11/2007 | Castro | H04L 12/2856 |
| | | | 370/360 |
| 2008/0025219 A1* | 1/2008 | Chao | H04L 47/10 |
| | | | 370/235 |
| 2008/0310394 A1* | 12/2008 | Hansen | H04W 76/02 |
| | | | 370/350 |
| 2009/0080864 A1 | 3/2009 | Rajakarunanayake | |
| 2010/0296437 A1* | 11/2010 | Stelle | H04L 45/125 |
| | | | 370/328 |
| 2011/0047591 A1* | 2/2011 | Scott | H04L 67/26 |
| | | | 726/1 |
| 2011/0116444 A1* | 5/2011 | Relyea | H04W 72/0453 |
| | | | 370/328 |
| 2013/0007263 A1 | 1/2013 | Soroushian et al. | |
| 2013/0007830 A1* | 1/2013 | Klappert | H04H 20/30 |
| | | | 725/116 |
| 2013/0142040 A1* | 6/2013 | Fryer | H04L 41/0896 |
| | | | 370/230 |
| 2014/0071968 A1* | 3/2014 | Raniere | H04W 48/18 |
| | | | 370/338 |

\* cited by examiner

METHOD AND APPARATUS FOR SETTING COMMUNICATING SESSION

CROSS-REFERENCE TO RELATED PATENT APPLICATION

This application claims priority from Indian Patent Application No. 3587/DEL/2014, filed on Dec. 8, 2014 in the Indian Intellectual Property Office and Korean Patent Application No. 10-2015-0163984, filed on Nov. 23, 2015 in the Korean Intellectual Property Office, the disclosures of which are incorporated herein by reference in their entireties.

BACKGROUND

1. Field

Methods and apparatuses consistent with exemplary embodiments relate to a method of setting a communicating session, an apparatus for setting a communicating session, and a non-transitory computer-readable recording medium having recorded thereon a program for executing the method of setting a communicating session.

2. Description of the Related Art

Earlier televisions were meant as a display device to display broadcasted content. Earlier computers were used to display web content and applications. Recently, the boundary between TVs and computers is collapsing. At present, users are able to connect to web content or perform applications via smart TVs connectable to the Internet, and are also able to watch broadcasted content via computers by using the Internet. Mobile devices, tablets, etc., which are being developed in the smart technology market, provide applications, widgets, browser, etc., and these operations are being performed through other electronic apparatuses.

In current implementation scenario, all the running applications are connected to the Internet to which electronic apparatuses are connected. This internet connection is shared among all applications.

SUMMARY

Provided are methods and apparatuses for determining a communicating session capable of providing a bandwidth necessary for an application currently being executed by a device and for setting the determined communicating session to the application in order to execute the application.

Additional aspects will be set forth in part in the description which follows and, in part, will be apparent from the description, or may be learned by practice of the presented embodiments.

According to an aspect of an exemplary embodiment, there is provided a method of setting a communicating session for executing an application including determining an available bandwidth of each of a plurality of communicating sessions connected to a device; determining a required bandwidth that is used to execute each of a plurality of applications that are executed on the device; allocating at least one communicating session to at least one application, based on strengths of the respective available bandwidths of the plurality of communicating sessions and strengths of the respective required bandwidths of the plurality of applications; and executing the at least one application by using the allocated at least one communicating session.

The allocating includes allocating a first communicating session to a first application from among the plurality of applications, based on the strengths of the respective available bandwidths of the plurality of communicating sessions and the strengths of the respective required bandwidths of the plurality of applications. The available bandwidth of the first communicating session exceeds the required bandwidth of the first application.

The method further includes classifying the plurality of applications into at least one group, based on the respective required bandwidths of the plurality of applications. The allocating includes allocating the at least one communicating session to each of the at least one group.

The required bandwidth is determined according to the amount of data that is transmitted or received during execution of each of the plurality of applications. The communicating session setting method further includes, when the required bandwidth of each of the plurality of applications changes according to a change in the amount of data transmitted or received, changing a communicating session allocated to each of the plurality of applications.

The method includes updating the available bandwidth, based on status information about the at least one communicating session; and changing the communicating session allocated to each of the plurality of applications, according to an update of the strength of the available bandwidth.

The method further includes acquiring information about a strength of a bandwidth allocated to another device from at least one of the plurality of communicating sessions. The available bandwidth is determined based on strengths of bandwidths providable by the plurality of communicating sessions and the strength of the bandwidth allocated to the other device.

The allocating includes allocating at least two communicating sessions that provide available bandwidths with different strengths, to at least one of the plurality of applications.

The required bandwidth is determined based on information about a bandwidth used before as the device executes the at least one application.

The determining further includes acquiring information about a required bandwidth of the at least one application from a server.

The method further includes, when a strength of a required bandwidth of a first application from among the at least one application exceeds a strength of an available bandwidth of a communicating session allocated to the first application, providing information about the first application.

According to an aspect of another exemplary embodiment, there is provided a device for setting a communicating session for executing an application including a communicator configured to set another device and at least one communicating session; and a controller configured to determine an available bandwidth that is provided from a plurality of communicating sessions and a required bandwidth that is used to execute at least one application, to allocate the at least one communicating session to a plurality of applications based on a strength of the available bandwidth and a strength of the required bandwidth, and to execute the at least one application by using the at least one communicating session.

The controller allocates a first communicating session to a first application from among the plurality of applications, based on the strengths of the respective available bandwidths of the plurality of communicating sessions and the strengths of the respective required bandwidths of the plurality of applications. The available bandwidth of the first communicating session exceeds the required bandwidth of the first application.

The controller classifies the plurality of applications into at least one group, based on the respective required bandwidths of the plurality of applications, and allocates the at least one communicating session to each of the at least one group.

The required bandwidth is determined according to the amount of data that is transmitted or received during execution of each of the plurality of applications. When the required bandwidth of each of the plurality of applications changes according to a change in the amount of data transmitted or received, the controller changes a communicating session allocated to each of the plurality of applications.

The controller updates the available bandwidth, based on status information about the at least one communicating session and changes the communicating session allocated to each of the plurality of applications, according to an update of the strength of the available bandwidth.

The communicator acquires information about a strength of a bandwidth allocated to another device from at least one of the plurality of communicating sessions. The available bandwidth is determined based on strengths of bandwidths providable by the plurality of communicating sessions and the strength of the bandwidth allocated to the other device.

The controller allocates at least two communicating sessions that provide available bandwidths with different strengths, to at least one of the plurality of applications.

The required bandwidth is determined based on information about a bandwidth used before as the device executes the at least one application.

The communicator acquires information about a required bandwidth of the at least one application from a server.

The device further includes an output unit configured to, when a strength of a required bandwidth of a first application from among the at least one application exceeds a strength of an available bandwidth of a communicating session allocated to the first application, provide information about the first application.

According to an aspect of another exemplary embodiment, there is provided a method of setting a communicating session for executing an application, the method including: determining an available bandwidth of each of a plurality of communicating sessions connected to a first device; determining a required bandwidth to execute each of a plurality of applications that are executed on the first device; allocating at least one communicating session of the plurality of communicating sessions to at least one application of the plurality of applications, based on strengths of the respective available bandwidths of the plurality of communicating sessions and strengths of the respective required bandwidths of the plurality of applications; and executing the at least one application using the allocated at least one communicating session.

The allocating may include allocating a first communicating session of plurality of communicating sessions to a first application from among the plurality of applications, based on the strengths of the respective available bandwidths of the plurality of communicating sessions and the strengths of the respective required bandwidths of the plurality of applications, and wherein the available bandwidth of the first communicating session exceeds the required bandwidth of the first application.

The method may further include classifying the plurality of applications into at least one group, based on the respective required bandwidths of the plurality of applications, wherein the allocating may include allocating the at least one communicating session to the at least one group.

The required bandwidth may be determined based on an amount of data that is transmitted or received during execution of each of the plurality of applications, and wherein the method may further include changing the at least one communicating session allocated to the at least one application to another one of the plurality of communicating sessions, when the required bandwidth of each of the plurality of applications changes based on a change in the amount of data transmitted or received.

The method may further include: updating strengths of the available bandwidths of the plurality of communicating sessions, based on status information about the at least one communicating session; and changing the at least one communicating session allocated to the at least one application to another one of the plurality of communicating sessions, according to the updated strengths of the available bandwidths.

The method may further include acquiring information about a strength of a bandwidth allocated to a second device from at least another one communicating session of the plurality of communicating sessions, wherein the available bandwidth may be determined based on strengths of bandwidths providable by the plurality of communicating sessions and the strength of the bandwidth allocated to the second device.

The allocating may include allocating at least two communicating sessions of the plurality of communicating sessions that provide available bandwidths with different strengths, to the at least one application.

The required bandwidth may be determined based on information about a predetermined bandwidth used by the first device to execute the at least one application.

The determining the required bandwidth may further include acquiring information about the required bandwidth of the at least one application from a server.

The method may further include providing information about the first application when a strength of the required bandwidth of a first application from among the at least one application exceeds a strength of an available bandwidth of a first communicating session of plurality of communicating sessions allocated to the first application.

According to an aspect of another exemplary embodiment, there is provided a device for setting a communicating session for executing an application, the device including: a communicator configured to set a second device paired with the device and at least one communicating session; and a controller configured to determine an available bandwidth that is provided from a plurality of communicating sessions and a required bandwidth to execute at least one application of a plurality of applications, to allocate the at least one communicating session of the plurality of communicating sessions to the at least one application based on a strength of the available bandwidth of each of the plurality of communicating sessions and a strength of the required bandwidth of each of the plurality of applications, and to execute the at least one application using the at least one communicating session.

The controller may be configured to allocate a first communicating session of the plurality of communicating sessions to a first application from among the plurality of applications, based on the strengths of the respective available bandwidths of the plurality of communicating sessions and the strengths of the respective required bandwidths of the plurality of applications, and wherein the available bandwidth of the first communicating session may exceed the required bandwidth of the first application.

The controller may be configured to classify the plurality of applications into at least one group, based on the respective required bandwidths of the plurality of applications, and allocates the at least one communicating session to the at least one group.

The required bandwidth may be determined based on an amount of data that is transmitted or received during execution of each of the plurality of applications, and wherein the controller may be configured to change the at least one communicating session allocated to the at least one application to another one of the plurality of communicating sessions in response to the required bandwidth of each of the plurality of applications changing based on a change in the amount of data transmitted or received.

The controller may be configured to update strengths of the available bandwidths of the plurality of communicating sessions, based on status information about the at least one communicating session and wherein the controller may be configured to change the at least one communicating session allocated to the at least one application to another one of the plurality of communicating sessions, according to the updated strengths of the available bandwidths.

The communicator may be configured to acquire information about a strength of a bandwidth allocated to the second device from at least another one communicating session of the plurality of communicating sessions, and wherein the available bandwidth may be determined based on strengths of bandwidths providable by the plurality of communicating sessions and the strength of the bandwidth allocated to the second device.

The controller may be configured to allocate at least two communicating sessions of the plurality of communicating sessions that provide available bandwidths with different strengths, to the at least one application.

The required bandwidth may be determined based on information about a predetermined bandwidth used by the device to execute the at least one application.

The communicator may be configured to acquire information about the required bandwidth of the at least one application from a server.

The device may further include an outputter configured to provide information about the first application in response to a strength of a required bandwidth of a first application from among the at least one application exceeding a strength of an available bandwidth of a first communicating session of plurality of communicating sessions allocated to the first application.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
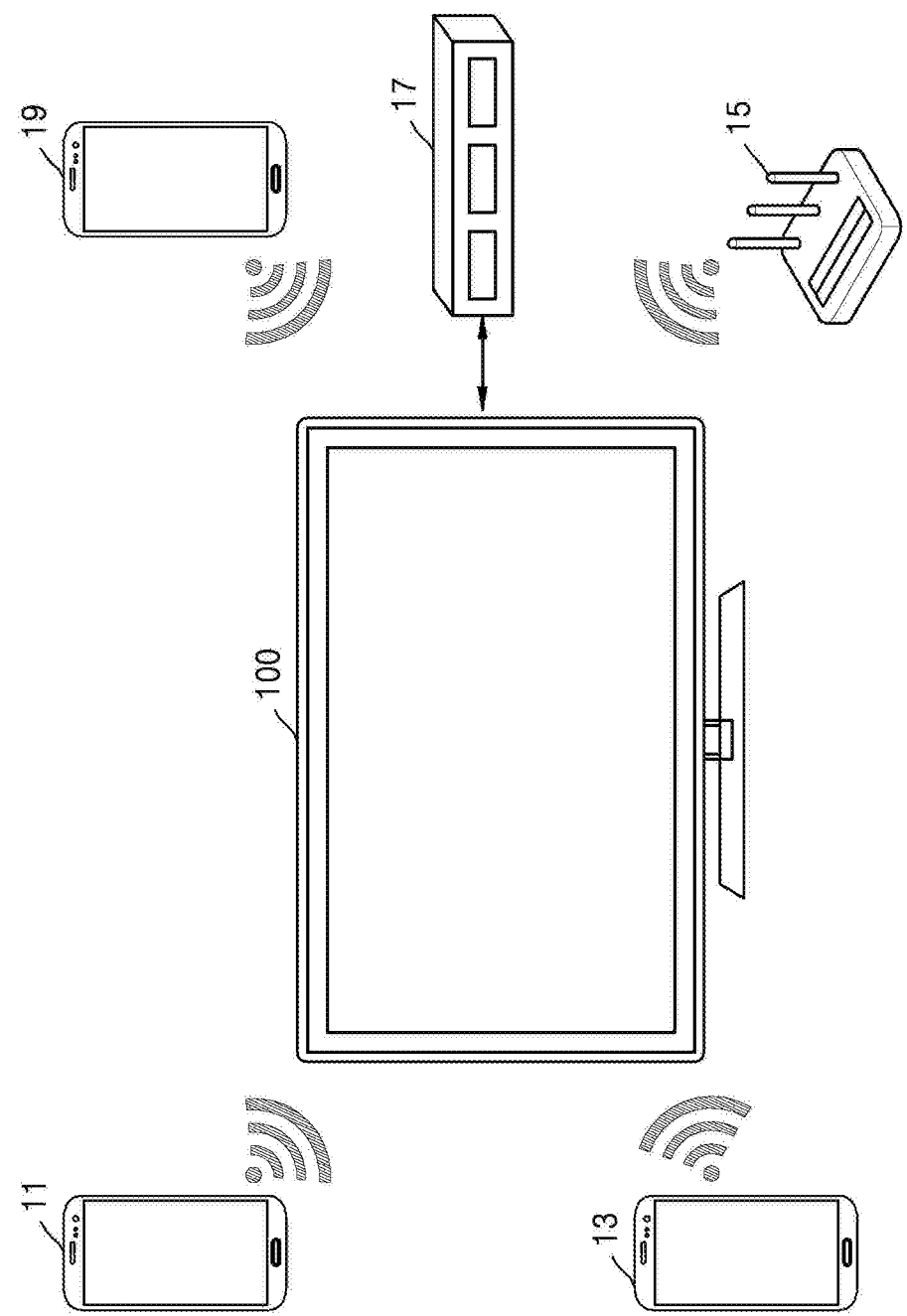
FIG. 1 is a schematic diagram for explaining a method of setting a communicating session for executing an application, according to an exemplary embodiment.

Hereinafter, the terms used in the specification will be briefly described, and then the present invention will be described in detail.

Although general terms widely used at present were selected for describing the inventive concept in consideration of the functions thereof, these general terms may vary according to intentions of one of ordinary skill in the art, case precedents, the advent of new technologies, and the like. Terms arbitrarily selected by the applicant of the present disclosure may also be used in a specific case. In this case, their meanings need to be given in the detailed description. Hence, the terms must be defined based on their meanings and the content of the entire specification, not by simply stating the terms.

The terms "comprises" and/or "comprising" or "includes" and/or "including" when used in this specification, specify the presence of stated elements, but do not preclude the presence or addition of one or more other elements. The terms ". . . unit" and ". . . module" when used in this specification refers to a unit in which at least one function or In operation is performed, and may be implemented as hardware, software, or a combination of hardware and software.

Exemplary embodiments of the present disclosure are described in detail herein with reference to the accompanying drawings so that this disclosure may be easily performed by one of ordinary skill in the art to which the present invention pertain. The inventive concept may, however, be embodied in many different forms and should not be construed as being limited to the exemplary embodiments set forth herein. In the drawings, parts irrelevant to the description are omitted for simplicity of explanation, and like numbers refer to like elements throughout.

Examples of a device described in the specification may include, but are not limited to, a digital TV, a desktop computer, a mobile phone, a smartphone, a tablet personal computer (PC), a laptop computer, a digital broadcasting terminal, a personal digital assistant (PDA), a portable multimedia player (PMP), and a navigation device.

An application denotes software designed so that a user performs a specific task by using a device. Examples of the application may include a moving picture reproduction application, a messenger application, a music reproduction application, and a video call application. The device may execute a plurality of applications. Some of the plurality of applications may be executed in the foreground of the device, and the others may be executed in the background of the device. Alternatively, the plurality of applications may be simultaneously executed in the foreground of the device via a multi-view application.

In the present specification, the multi-view application splits the screen area of a device into a plurality of independent windows and displays some content on each of the plurality of independent windows. The content items respectively displayed on the plurality of independent window may be, for example, broadcasted content, application content, widget content, and browser content. Content displayed on one of the plurality of windows may be independent from that displayed on another window. Different applications may be performed on the plurality of windows.

The exemplary embodiments will now be described more fully with reference to the accompanying drawings.

FIG. 1 is a schematic diagram for explaining a method of setting a communicating session for executing an application, according to an exemplary embodiment.

Referring to FIG. 1, a device 100 may detect a plurality of available communicating sessions. The plurality of communicating sessions may be provided by a plurality of communicating devices 11, 13, 15, 17, and 19, respectively. The communicating devices may include a mobile phone, a laptop computer, a Wi-Fi router, a personal computer (PC), etc. For example, the communicating devices may provide communicating sessions to the device 100 via a hot spot. As another example, the communicating devices may provide communicating sessions to the device 100 via wired or wireless media.

For example, when communicating devices exist within a predetermined distance from the device 100, the device 100 may detect communicating sessions that may be provided by the communicating devices. However, this is only an exemplary embodiment, and the device 100 may detect available communicating sessions via signals transmitted by the communicating devices, or may acquire information about the available communicating sessions from an external device.

The device 100 may determine respective available bandwidths of the plurality of available communicating sessions. An available bandwidth of a communicating session may represent a data processing capability of the communicating session. For example, the available bandwidth of the communicating session may represent a maximum available capacity of traffic that can be accepted by the communicating session. According to an exemplary embodiment, the device 100 may determine the strength of an available bandwidth of a communicating session, based on information about the communicating session or the intensity of a signal received from a communicating device. However, the exemplary embodiment is not limited thereto. As another example, the device 100 may acquire information about an available bandwidth of a communicating session from an external device.

According to an exemplary embodiment, the device 100 may execute at least one application. For example, the device 100 may execute an application selected by a user from among a plurality of applications executable by the device 100, on the device 100. When the selected application on the device 100 needs an operation of transmitting or receiving data to or from the external device, the device 100 may allocate a communicating session to the selected application according to a required bandwidth of the selected application. The required bandwidth may represent a data processing capability of the communicating session that is required to process data regarding execution of the application.

Different applications may require different bandwidths. For example, an application for providing video streaming may require a higher strength bandwidth than other applications. An application for providing an audio or video call may also require a larger strength bandwidth than other applications. Conversely, a browser for internet surfing may require a smaller strength bandwidth than the aforementioned applications. Applications that perform a chatting function, a search function, and an information providing function may also require smaller strength bandwidths than the other applications.

According to an exemplary embodiment, the device 100 may determine a communicating session that is to be allocated to an application currently being executed on the device 100, based on a required bandwidth of the application and the available bandwidths of the communicating sessions connectable to the device 100. For example, the device 100 may select a communicating session capable of providing an available bandwidth that exceeds the required bandwidth of the application being executed.

Figure 2:
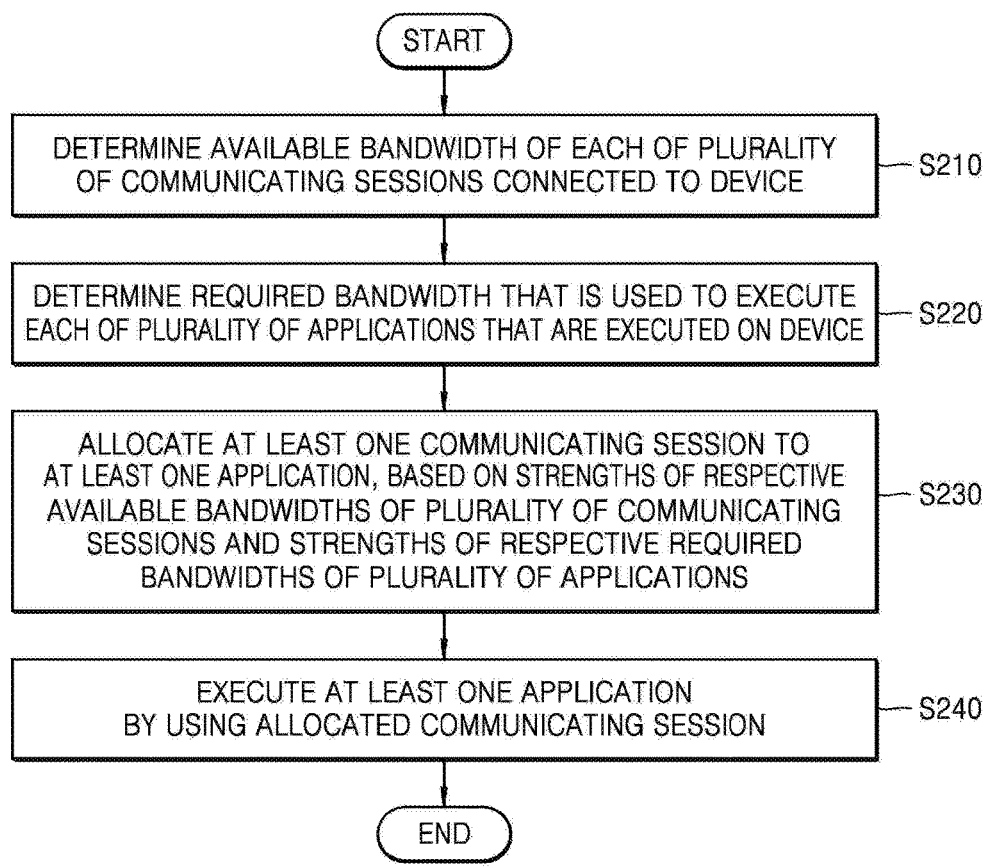
FIG. 2 is a flowchart of a method, performed by a device, of setting a communicating session for executing an application, according to an exemplary embodiment.

FIG. 2 is a flowchart of a method, performed by the device 100, of setting a communicating session for executing an application, according to an exemplary embodiment.

In operation S210, the device 100 determines an available bandwidth of each of a plurality of communicating sessions connected to the device 100.

According to an exemplary embodiment, the device 100 may be connected to a plurality of communicating sessions respectively provided by a plurality of communicating devices. The device 100 may receive bandwidths from the connected communicating sessions.

The device 100 may acquire information about the available bandwidth of each of the plurality of communicating sessions connected to the device 100. For example, the device 100 may acquire information about the strength of the available bandwidth of each of the plurality of communicating sessions connected to the device 100. The information about the available bandwidth of each of the plurality of communicating sessions may be provided by the plurality of communicating devices or by an external server.

In operation S220, the device 100 determines a required bandwidth to execute each of a plurality of applications that are executed on the device 100.

According to an exemplary embodiment, the device 100 may execute at least one of the plurality of applications. The device 100 may determine a required bandwidth representing a bandwidth required to process data about the application being executed. For example, the device 100 may acquire information about a required bandwidth of a currently-being-executed application from metadata of the currently-being-executed application.

In operation S230, the device 100 allocates at least one communicating session to at least one application, based on the strengths of the respective available bandwidths of the plurality of communicating sessions and the strengths of the respective required bandwidths of the plurality of applications.

According to an exemplary embodiment, the device 100 may determine a communicating session that is allocated to an application, based on a bandwidth required to execute the application. For example, the device 100 may select a communicating session of which an available bandwidth exceeds the required bandwidth of the application, from among the plurality of communicating sessions. However, this is only an exemplary embodiment, and a method, performed by the device 100, of allocating a communicating session from among the plurality of communicating sessions to an application is not limited thereto. As another example, the device 100 may select a communicating session of which an available bandwidth is 1.5 or more times the required bandwidth of the application, from among the plurality of communicating sessions.

In operation S240, the device 100 executes at least one application by using the allocated communicating session.

According to an exemplary embodiment, the device 100 may transmit or receive data about the at least one application to or from the external device, via the at least one communicating session allocated to the at least one application. The device 100 may execute the at least one application, based on the data transmitted or received via the at least one allocated communicating session.

Figure 3:
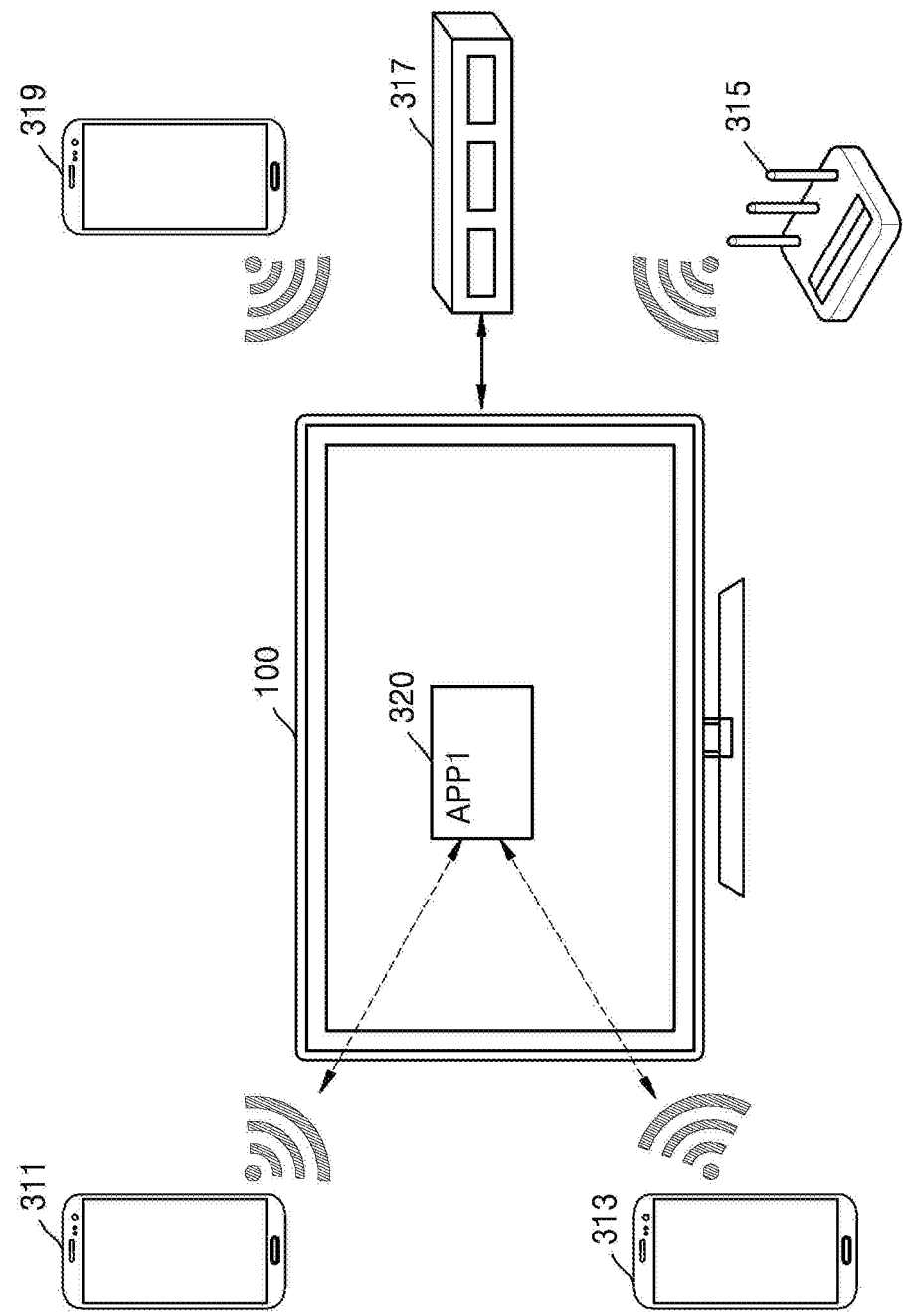
FIG. 3 is a schematic diagram for explaining a method, performed by a device, of allocating at least one of a plurality of communicating sessions to an application being executed on the device, according to an exemplary embodiment.

FIG. 3 is a schematic diagram for explaining a method, performed by the device 100, of allocating at least one of a plurality of communicating sessions to an application being executed on the device 100, according to an exemplary embodiment.

Referring to FIG. 3, the device 100 may determine an available bandwidth of each of a plurality of communicating sessions connectable to the device 100. The plurality of communicating sessions may be provided by a plurality of communicating devices 311, 313, 315, 317, and 319, respectively. For example, the device 100 may determine the strength of the available bandwidth of each of the plurality of communicating sessions connectable to the device 100.

According to an exemplary embodiment, the device 100 may determine the strength of a required bandwidth of an APP1 320 that is currently being executed. For example, the device 100 may acquire information about the strength of the required bandwidth of the Application 1 (APP1) 320 from metadata of the APP1 320. The APP1 320 may be a multi-view application, a multi-tab application, or a multi-thread processing application.

According to an exemplary embodiment, the device 100 may allocate, to the APP1 320, a first communicating session and a second communicating session capable of providing an available bandwidth higher than the required bandwidth of the APP1 320. The first communicating session and the second communicating session may be provided from the first communicating device 311 and the second communicating device 313, respectively, to the device 100. For example, the device 100 may allocate to the APP1 320 the first communicating session and the second communicating session respectively provided by the first communicating device 311 and the second communicating device 313.

Figure 4:
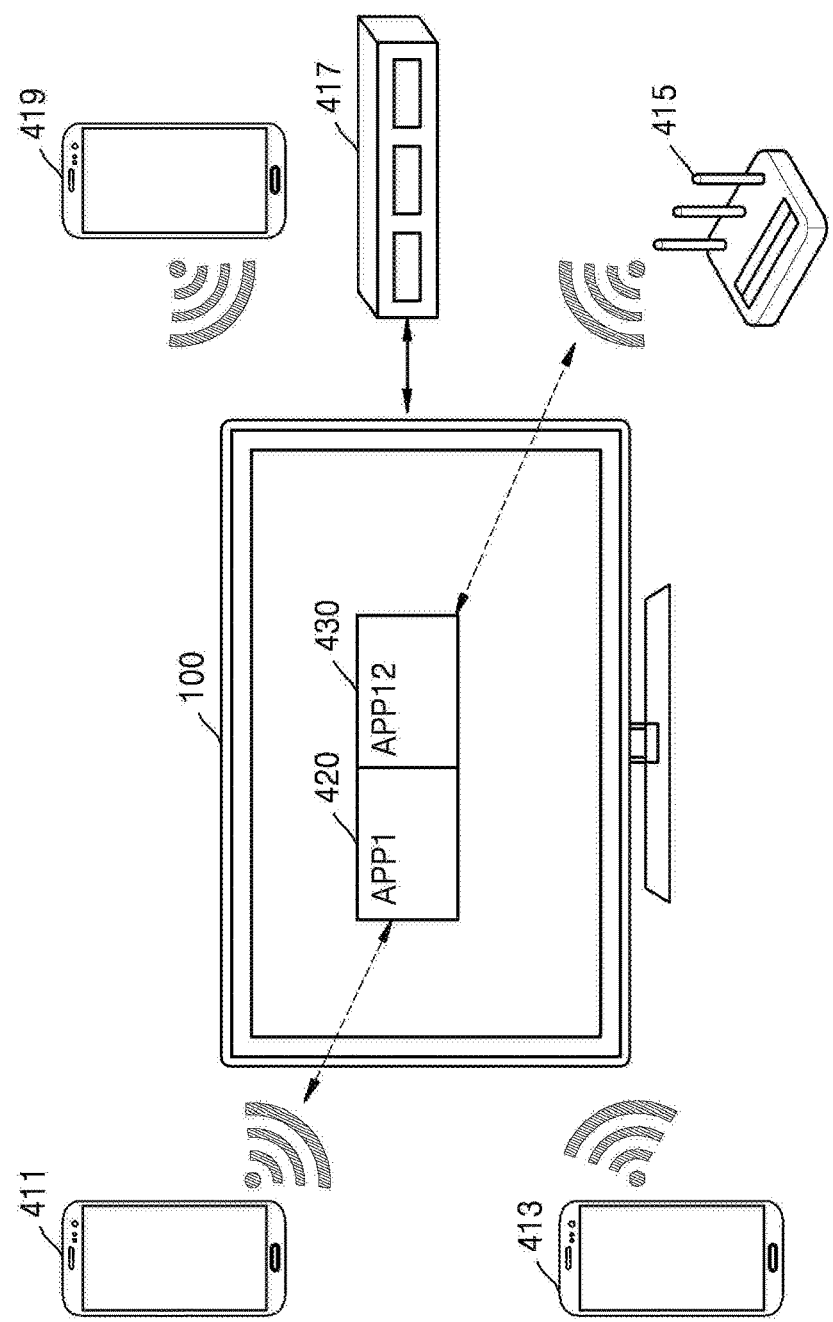
FIG. 4 is a schematic diagram for explaining a method, performed by a device, of allocating at least one of a plurality of communicating sessions to an application being executed on the device, according to another exemplary embodiment.

FIG. 4 is a schematic view for explaining a method, performed by the device 100, of allocating at least one of a plurality of communicating sessions to an application currently being executed on the device 100, according to an exemplary embodiment.

According to an exemplary embodiment, the device 100 may execute an APP1 420 and an APP2 430. The device 100 may determine the strengths of required bandwidths that are respectively used to execute the currently-being-executed APP1 420 and the APP2 430.

According to an exemplary embodiment, the device 100 may determine an available bandwidth of each of a plurality of communicating sessions connected to the device 100. The plurality of communicating sessions may be provided by a plurality of communicating devices 411, 413, 415, 417, and 419, respectively, to the device 100.

According to an exemplary embodiment, the device 100 may determine at least one communicating session that is allocated to each of the APP1 420 and the APP2 430, based on the strengths of the respective required bandwidths of the APP1 420 and the APP2 430 and the strength of the respective available bandwidths of the plurality of communicating sessions connected to the device 100. Referring to FIG. 4, the device 100 may allocate a first communicating session and a third communicating session respectively provided by the first and third communicating devices 411 and 415 to the APP1 420 and the APP2 430, respectively. It may be assumed that the strength of the required bandwidth of the APP1 420 is less than that of the available bandwidth of the first communicating session, and the strength of the required bandwidth of the APP2 430 is less than that of the available bandwidth of the third communicating session.

Figure 5:
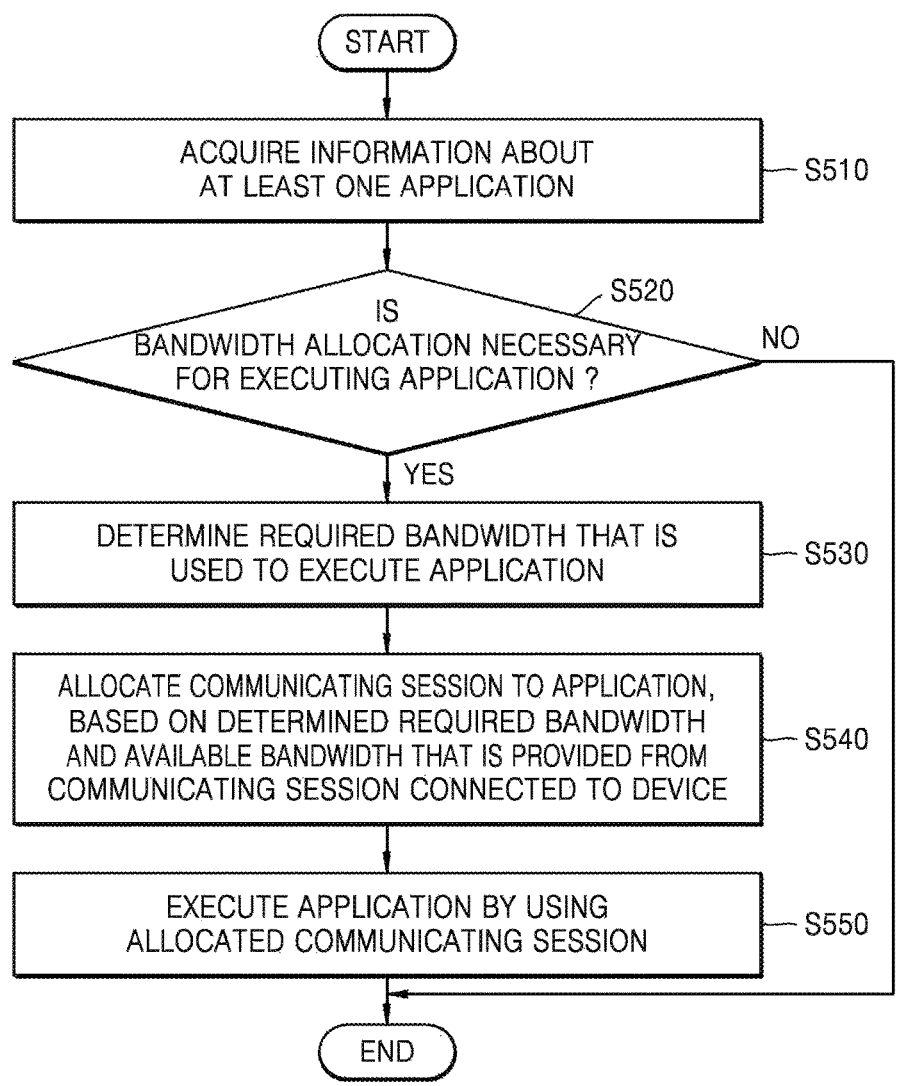
FIG. 5 is a detailed flowchart of a method, performed by a device, of setting a communicating session for executing an application, according to an exemplary embodiment.

FIG. 5 is a detailed flowchart of a method, performed by the device 100, of setting a communicating session for executing an application, according to an exemplary embodiment.

In operation S510, the device 100 may acquire information about at least one application.

According to an exemplary embodiment, the device 100 may acquire information about at least one application that is executed on the device 100. The information about the at least one application may include metadata of the at least one application. Information about an application may include information about whether a communicating session is to be allocated during execution of the application, and information about a required bandwidth of a communicating session that is to be allocated to the application.

In operation S520, the device 100 may determine whether bandwidth allocation is necessary for executing an application.

According to an exemplary embodiment, the device 100 may determine whether bandwidth allocation is necessary for executing an application, based on the acquired information about the at least one application. For example, by using metadata about a music reproduction application currently being executed by the device 100, the device 100 may determine that bandwidth allocation is necessary for executing the music reproduction application.

In operation S530, the device 100 may determine a required bandwidth that is used to execute the application. As it is determined that bandwidth allocation is necessary for executing the application, the device 100 may determine the required bandwidth that is used to execute the application, by using information about the application.

For example, the device 100 may determine the strength of a required bandwidth that is immediately needed by a currently-being-executed application. As another example, the device 100 may determine the strength of a required bandwidth of a current application based on the strength of a required bandwidth used to execute a previous application, based on history information of applications. As another example, the device 100 may determined the strength of a required bandwidth that is used to execute an application, based on data about the application acquired from an external device.

In operation S540, the device 100 may allocate a communicating session to the application, based on the determined required bandwidth and an available bandwidth that is provided from a communicating session connected to the device 100.

According to an exemplary embodiment, the device 100 may determine the strength of an available bandwidth providable by each of a plurality of communicating sessions connected to the device 100. For example, the device 100 may determine the strengths of available bandwidths respectively immediately providable by the plurality of communicating sessions connected to the device 100. As another example, the device 100 may determine the sizes of the available bandwidths, based on history information of available bandwidths previously provided by the plurality of communicating sessions. As another example, the device 100 may determine an available bandwidth that is providable based on a strength of a signal received from an external device providing communicating session.

According to an exemplary embodiment, the device 100 may compare the strengths of the available bandwidths respectively providable by the plurality of communicating sessions with the size of the required bandwidth of the application and thus may allocate a communicating session to the application. For example, the device 100 may allocate, to the application, a communicating session capable of providing an available bandwidth that exceeds the required bandwidth of the application.

When a plurality of communicating sessions are capable of providing an available bandwidth that exceeds the required bandwidth of the application, the device 100 may allocate a communicating session having a highest priority to the application, based on priority information previously determined for each of the plurality of communicating sessions.

In operation S550, the device 100 may execute the application by using the allocated communicating session.

According to an exemplary embodiment, the device 100 may transmit or receive data about the at least one application to or from the external device, via the at least one communicating session allocated to the at least one application. The device 100 may execute the at least one application, based on the data transmitted or received via the at least one allocated communicating session.

Figure 6:
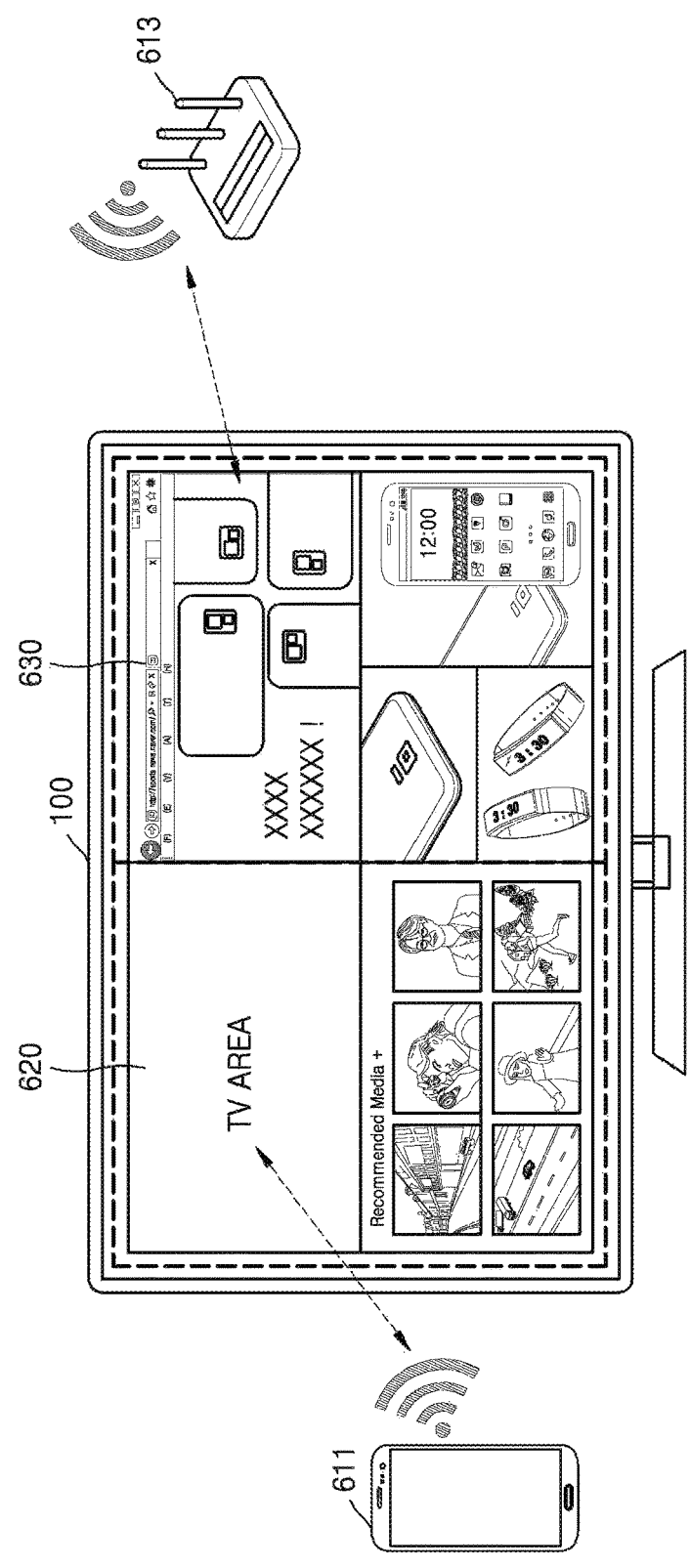
FIG. 6 is a schematic diagram for explaining a method, performed by a device, of allocating a communicating session to each of a plurality of applications that are being executed, according to an exemplary embodiment.

FIG. 6 is a schematic diagram for explaining a method, performed by the device 100, of allocating a communicating session to each of a plurality of applications that are being executed, according to an exemplary embodiment.

According to an exemplary embodiment, the device 100 may be connected to a plurality of communicating devices 611 and 613. The device 100 may determine the strength of an available bandwidth receivable from each of the plurality of communicating devices 611 and 613. For example, the device 100 may determine the strengths of the available bandwidths respectively providable by the plurality of communicating devices 611 and 613, based on information received from each of the plurality of communicating devices 611 and 613. As another example, the device 100 may previously store information about the available bandwidths respectively receivable from the plurality of communicating devices 611 and 613.

Referring to FIG. 6, the device 100 may execute a broadcast reproduction application and a web browser application. For example, the broadcast reproduction application may be executed on a first window 620 on the screen of the device 100, and the web browser application may be executed on a second window 630 on the screen of the device 100. The device 100 may determine a required bandwidth that is used to execute the broadcast reproduction application, based on metadata of the broadcast reproduction application. The device 100 may determine the strength of a required bandwidth that is used to execute the web browser application, based on metadata of the web browser application.

According to an exemplary embodiment, the device 100 may determine a communicating session that is to be allocated to the broadcast reproduction application, and a communicating session that is to be allocated to the web browser application, based on the strengths of the respective required bandwidths of the broadcast reproduction application and the web browser application and the strengths of the available bandwidths respectively providable by the plurality of communicating devices 611 and 613. It is assumed that the strength of the available bandwidth provided by the first communicating device 611 exceeds the strengths of the respective required bandwidths of the broadcast reproduction application and the web browser application. It is also assumed that the strength of the available bandwidth provided by the second communicating device 613 is less than or equal to the size of the required bandwidth of the broadcast reproduction application and exceeds the size of the required bandwidth of the web browser application.

The device 100 may allocate a communicating session of the first communicating device 611 to the broadcast reproduction application, and allocate a communicating session of the second communicating device 613 to the web browser application. Accordingly, the device 100 may receive broadcasted content that is reproduced via the broadcast reproduction application, via the communicating session of the first communicating device 611. The device 100 may also receive a web page that is reproduced via the web browser application, via the communicating session of the second communicating device 613.

Figure 7:
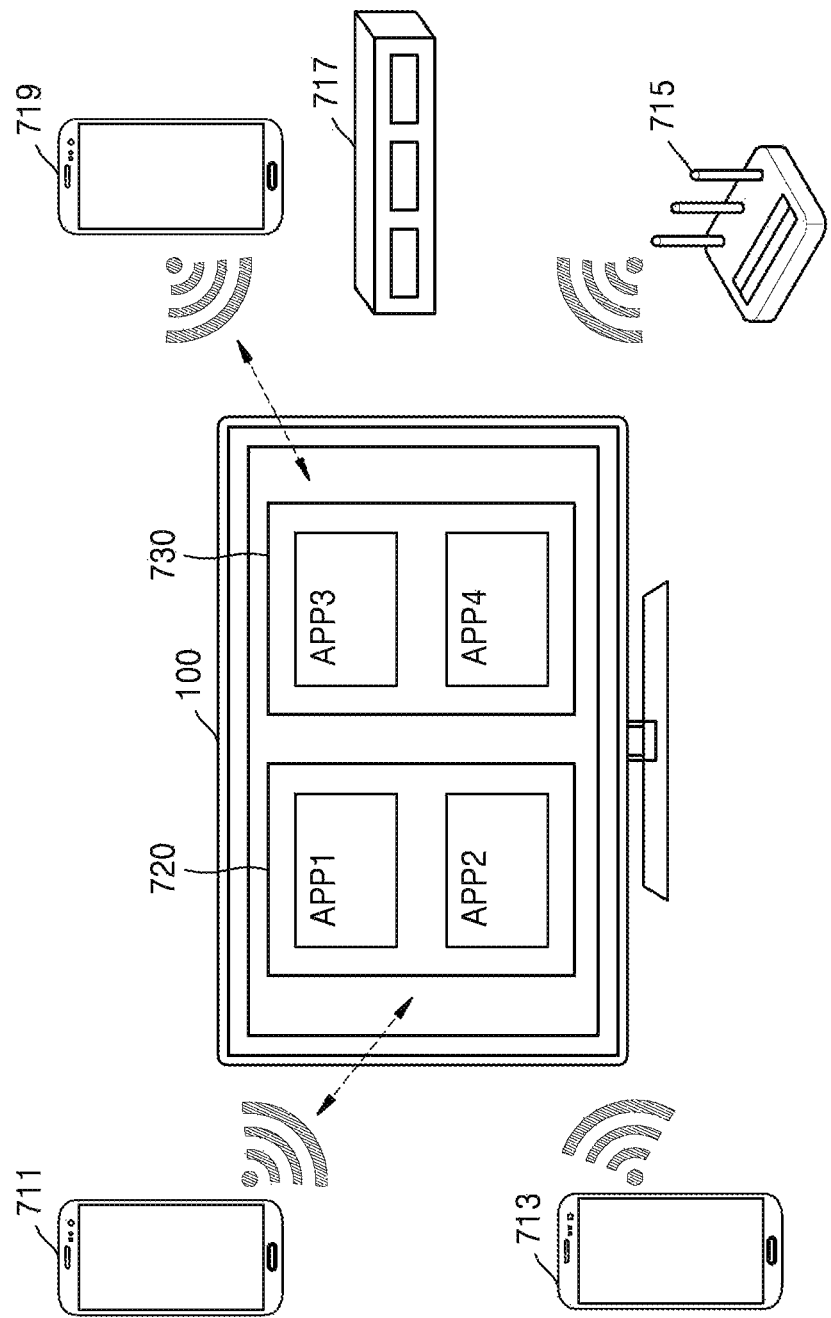
FIG. 7 is a schematic diagram for explaining a method, performed by a device, of classifying a plurality of currently-being-executed applications into groups and allocating a communicating session to each of the groups, according to an exemplary embodiment.

FIG. 7 is a schematic diagram for explaining a method, performed by the device 100, of classifying a plurality of currently-being-executed applications into groups and allocating a communicating session to each of the groups, according to an exemplary embodiment.

According to an exemplary embodiment, the device 100 may be connected to a plurality of communicating devices 711, 713, 715, 717, and 719. The device 100 may determine the strength of an available bandwidth receivable from each of the plurality of communicating devices 711, 713, 715, 717, and 719. For example, the device 100 may determine the strengths of the available bandwidths respectively providable by the plurality of communicating devices 711, 713, 715, 717, and 719, based on information received from each of the plurality of communicating devices 711, 713, 715, 717, and 719. As another example, the device 100 may previously store information about the available bandwidths respectively receivable from the plurality of communicating devices 711, 713, 715, 717, and 719.

According to an exemplary embodiment, the device 100 may execute a plurality of applications APP1, APP2, APP3, and APP4. The device 100 may classify the plurality of applications into groups, based on the strengths of respective required bandwidths of the plurality of applications. Referring to FIG. 7, the applications APP1 and APP2 may be classified into a first group 720, and the applications APP3 and APP4 may be classified into a second group 730.

Accordingly, the device 100 may execute the applications APP1 and APP2 via a communicating session of the first communicating device 711, and may execute the applications APP3 and APP4 via a communicating session of the fifth communicating device 719.

As a sum of the strengths of the required bandwidths of the applications APP1 and APP2 included in the first group 720 is less than the strength of the available bandwidth provided by the communicating session of the first communicating device 711, the device 100 may allocate the communicating session of the first communicating device 711 to the applications APP1 and APP2 included in the first group 720.

As a sum of the strengths of the required bandwidths of the applications APP3 and APP4 included in the second group 730 is less than the size of the available bandwidth provided by the communicating session of the fifth communicating device 719, the device 100 may allocate the communicating session of the fifth communicating device 719 to the applications APP3 and APP4 included in the second group 730.

Figure 8:
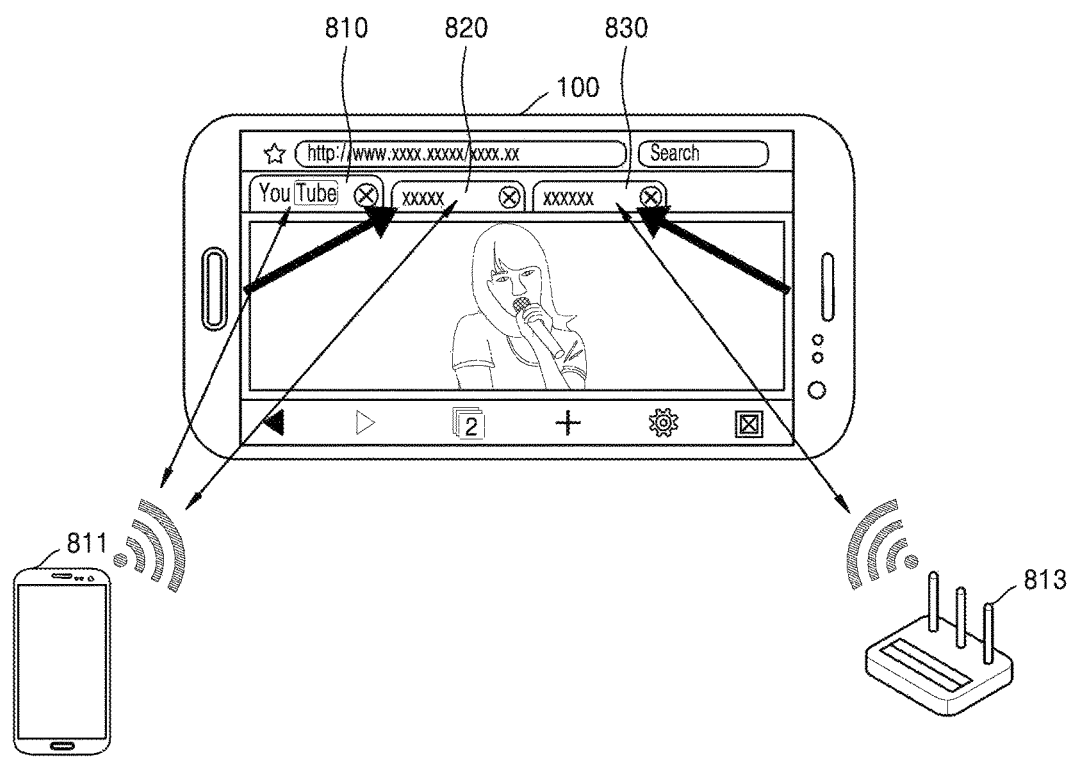
FIG. 8 is a schematic diagram for explaining a method, performed by a device, of allocating a communicating session when a web browser application is executed, according to an exemplary embodiment.

FIG. 8 is a schematic diagram for explaining a method, performed by the device 100, of allocating a communicating session when a web browser application is executed, according to an exemplary embodiment.

Referring to FIG. 8, as the web browser application is executed, each tab displayed on the screen of the device 100 may be treated as a separate web entity or a session running, and thus the tabs may run independently from one another.

According to an exemplary embodiment, the device 100 may be connected to a plurality of communicating devices 811 and 813. The device 100 may determine the strength of an available bandwidth receivable from each of the plurality of communicating devices 811 and 813. For example, the device 100 may determine the strengths of the available bandwidths respectively providable by the plurality of communicating devices 811 and 813, based on information received from each of the plurality of communicating devices 811 and 813. As another example, the device 100 may previously store information about the available bandwidths respectively receivable from the plurality of communicating devices 811 and 813.

According to an exemplary embodiment, the device 100 may execute a web browser application. During execution of the web browser application, a plurality of tabs may be generated on one window displayed on the screen of the device 100, according to selection by a user. When a plurality of tabs are generated in the web browser application, a web page may be independently browsed in each of the plurality of tabs.

For example, referring to FIG. 8, when the device 100 executes the web browser application, a plurality of tabs 810, 820, and 830 may be generated. Each of the plurality of tabs 810, 820, and 830 may independently receive data about a web page. For example, as a user inputs a URL address of a moving picture reproduction site, the first tab 810 may display a web page of the moving picture reproduction site. It is assumed that, when the device 100 receives moving picture data from the moving picture reproduction site, the device 100 requires a bandwidth of 10W.

As another example, the second tab 820 may display a web page of a portal site. It is assumed that, when the device 100 receives image data and text data from the portal site, the device 100 requires a bandwidth of 5W.

As another example, the third tab 830 may display a web page of a site that provides an encyclopedia function. It is assumed that, when the device 00 receives text data from a web page of the site that provides an encyclopedia function, the device 100 requires a bandwidth of 2W.

According to an exemplary embodiment, the device 100 may allocate communicating sessions to the plurality of tabs 810, 820, and 830, based on the strengths of required bandwidths used to receive web site pages from the plurality of tabs 810, 820, and 830 of the web browser application and the strengths of available bandwidths of a plurality of communicating sessions connected to the device 100.

For example, when an available bandwidth providable by a communicating session of the first communicating device 811 exceeds a sum of the required bandwidths of the web pages displayed on the first tab 810 and the second tab 820, the device 100 may allocate the communicating session of the first communicating device 811 to the first tab 810 and the second tab 820. As another example, when an available bandwidth providable by a communicating session of the second communicating device 813 exceeds the required bandwidth of the web page displayed on the third tab 830, the device 100 may allocate the communicating session of the second communicating device 813 to the third tab 830.

Accordingly, the device 100 may receive data from a server of a web site displayed on each of the first and second tabs 810 and 820, via the communicating session of the first communicating device 811. The device 100 may also receive data from a server of a web site displayed on the third tab 830, via the communicating session of the second communicating device 813.

Figure 9:
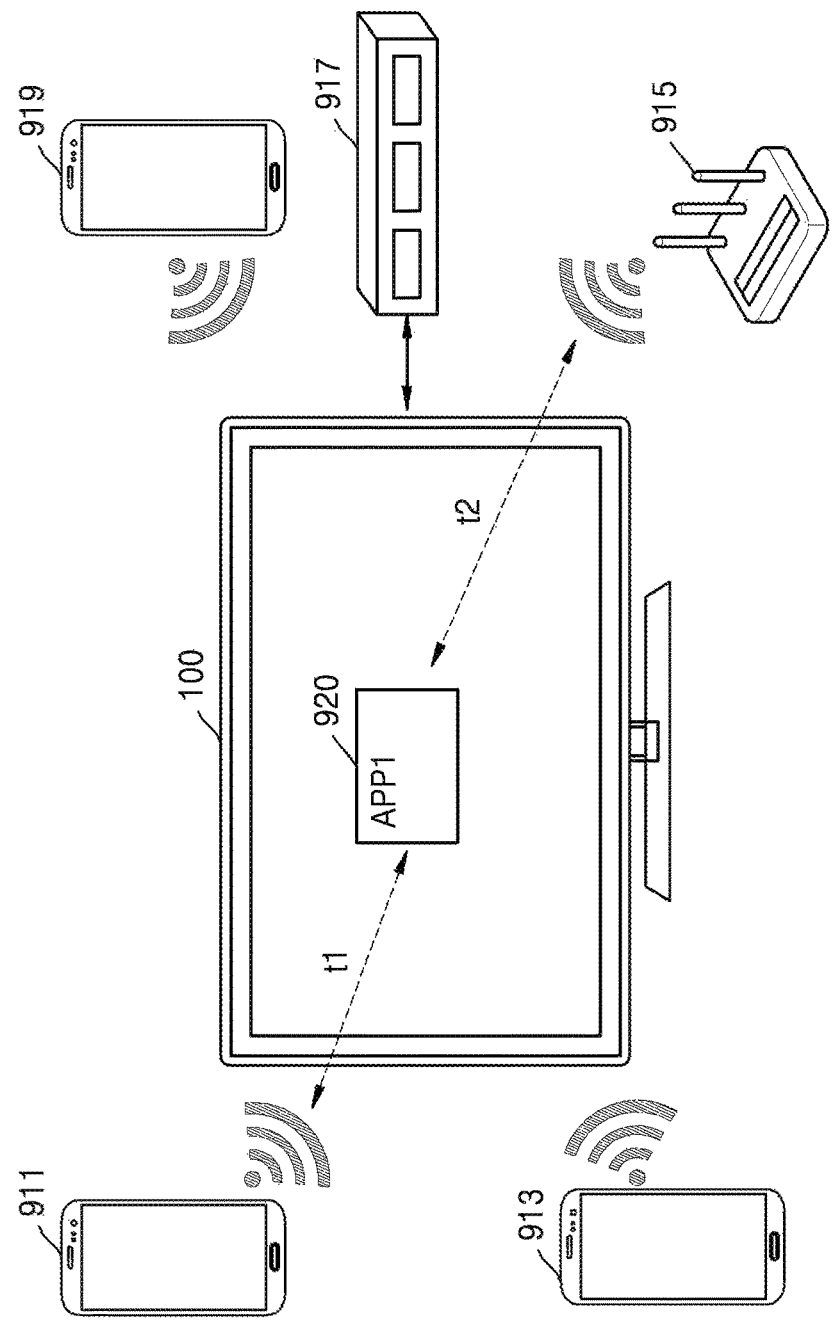
FIG. 9 is a schematic diagram for explaining a method, performed by a device, of changing, with time, a communicating session that is allocated to an application, when the application is executed, according to an exemplary embodiment.

FIG. 9 is a schematic diagram for explaining a method, performed by the device 100, of changing, with time, a communicating session that is allocated to an application 920, when the application 920 is executed, according to an exemplary embodiment.

According to an exemplary embodiment, the device 100 may execute the APP1 920. The device 100 may determine a required bandwidth that is used to execute the APP1 920, based on metadata of the APP1 920.

According to an exemplary embodiment, the device 100 may be connected to a plurality of communicating devices 911, 913, 915, 917, and 919. The device 100 may determine the strength of an available bandwidth receivable from each of the plurality of communicating devices 911, 913, 915, 917, and 919. For example, the device 100 may determine the strengths of available bandwidths respectively providable by the plurality of communicating devices 911, 913, 915, 917, and 919, based on information received from each of the plurality of communicating devices 911, 913, 915, 917, and 919.

According to an exemplary embodiment, the device 100 may determine a communicating session that is allocated to the APP1 920, based on the strength of the required bandwidth and of the currently-being-executed APP1 920 and the strengths of respective available bandwidths of a plurality of communicating sessions connected to the device 100.

The strengths of the respective available bandwidths of the plurality of communicating sessions connected to the device 100 may change with time. When the strengths of the respective available bandwidths of the plurality of communicating sessions are changed, the device 100 may change a communicating session that is allocated to the APP1 920.

For example, referring to FIG. 9, an available bandwidth of a first communicating session may exceed the required bandwidth of the APP1 920 for a first time interval t1, whereas the available bandwidth of the first communicating session may not exceed the required bandwidth of the APP1 920 for a second time interval t2. In this case, the device 100 may select a communicating session capable of providing an available bandwidth that exceeds the required bandwidth of the APP1 920 for the second time interval t2. Accordingly, the device 100 may allocate to the APP1 920 a third communicating session capable of providing an available bandwidth that exceeds the required bandwidth of the APP1 920 for the second time interval t2.

Figure 10:
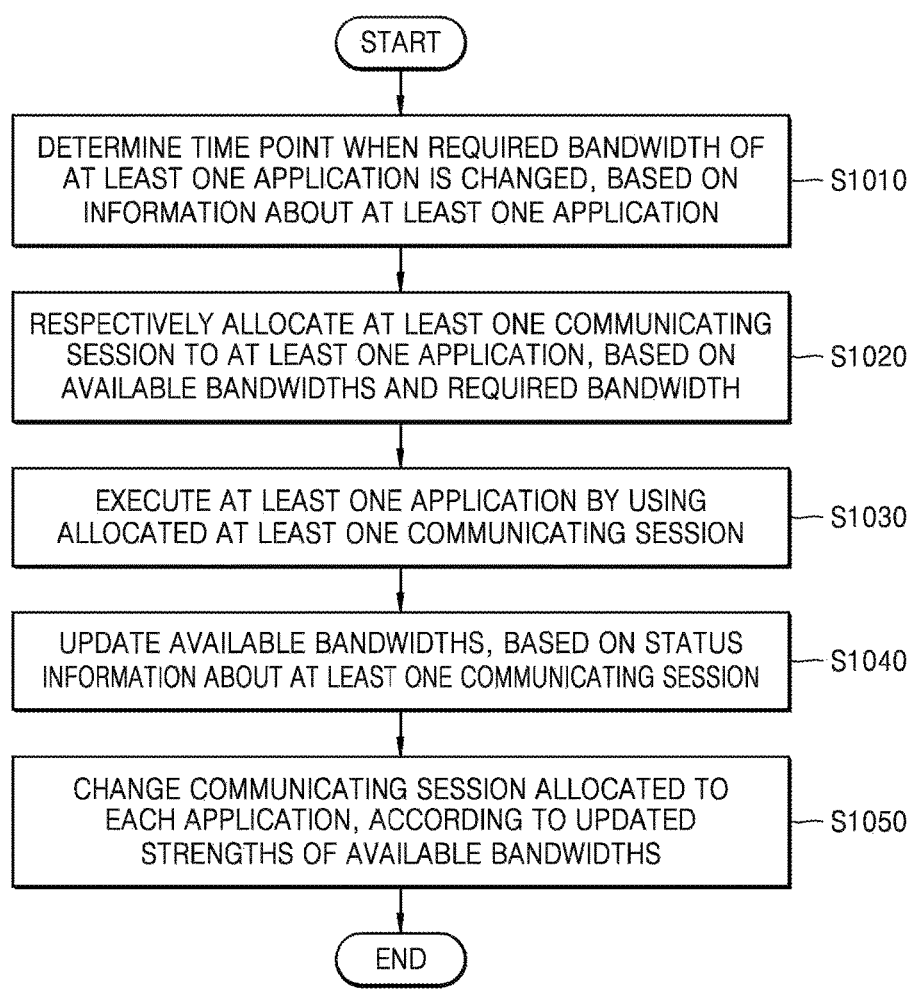
FIG. 10 is a flowchart of a method, performed by the device, of allocating a communicating session to an application when the strength of a required bandwidth of the application changes with time, according to an exemplary embodiment.

FIG. 10 is a flowchart of a method, performed by the device 100, of allocating a communicating session to an application when the strength of a required bandwidth of the application changes with time, according to an exemplary embodiment.

In operation S1010, the device 100 may determine a time point when a required bandwidth of at least one application is changed, based on information about the at least one application.

According to an exemplary embodiment, the device 100 may determine a required bandwidth of an application currently being executed on the device 100, based on information about the currently-being-executed application. As data that is transmitted or received during the execution of the application changes with time, the required bandwidth of the application may change. The device 100 may acquire information about the time point when the required bandwidth of the at least one application changes, based on the information about the at least one application.

In operation S1020, the device 100 may respectively allocate at least one communicating session to the at least one application, based on available bandwidths and the required bandwidth.

According to an exemplary embodiment, the device 100 may determine an available bandwidth of each of a plurality of communicating sessions connected to the device 100. Based on the strengths of the available bandwidths of the plurality of communicating sessions and the strength of the required bandwidth of the at least one application, the device 100 may allocate a communicating session capable of providing an available bandwidth that exceeds the strength of the required bandwidth of the at least one application.

In operation S1030, the device 100 may execute the at least one application by using the allocated at least one communicating session.

In operation S1040, the device 100 may update the available bandwidths, based on status information about the at least one communicating session.

According to an exemplary embodiment, the device 100 may determine whether the strength of an available bandwidth of each of at least one communicating session connected to the device 100 has changed. When the device 100 determines that the strength of the available bandwidth has changed, the device 100 may update information about the strength of the available bandwidth of each of the at least one communicating session.

In operation S1050, the device 100 may change the communicating session allocated to each application, according to the updated strengths of the available bandwidths.

According to an exemplary embodiment, the device 100 may change the communicating session allocated to each application, according to updates of the available bandwidth strengths. For example, when a required bandwidth of an application changes with time or an available bandwidth of each communicating session connected to the device 100 changes with time, the device 100 may determine whether an available bandwidth of a communicating session allocated to a currently-being-executed application exceeds the required bandwidth of the currently-being-executed application. When the available bandwidth of the communicating session allocated to the currently-being-executed application does not exceed the required bandwidth of the currently-being-executed application, the device 100 may change the communicating session allocated to the currently-being-executed application.

Figure 11:
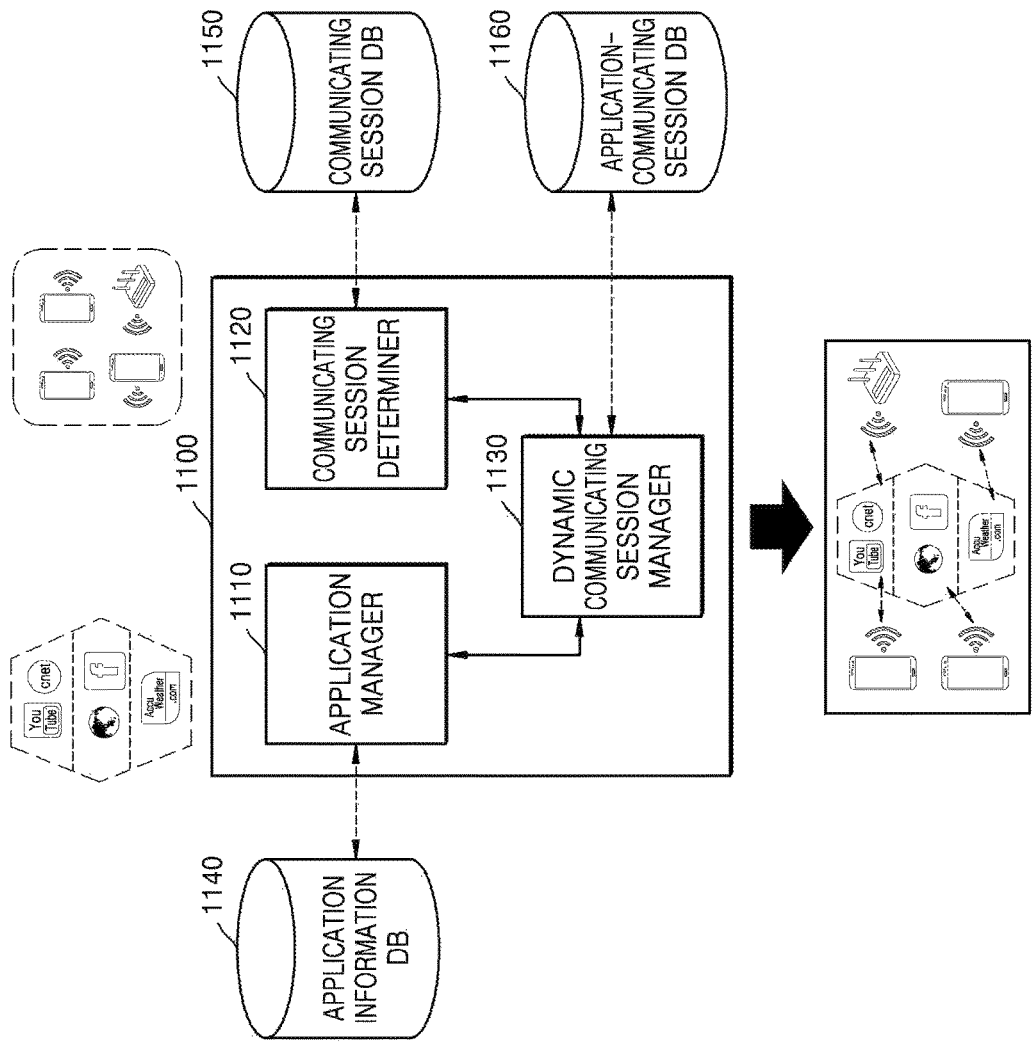
FIGS. 11 and 12 are schematic diagrams for explaining a method, performed by a device, of allocating a communicating session to an application currently being executed on the device, based on respective available bandwidths of a plurality of communicating sessions connected to the device, according to another exemplary embodiment.
Figure 12:
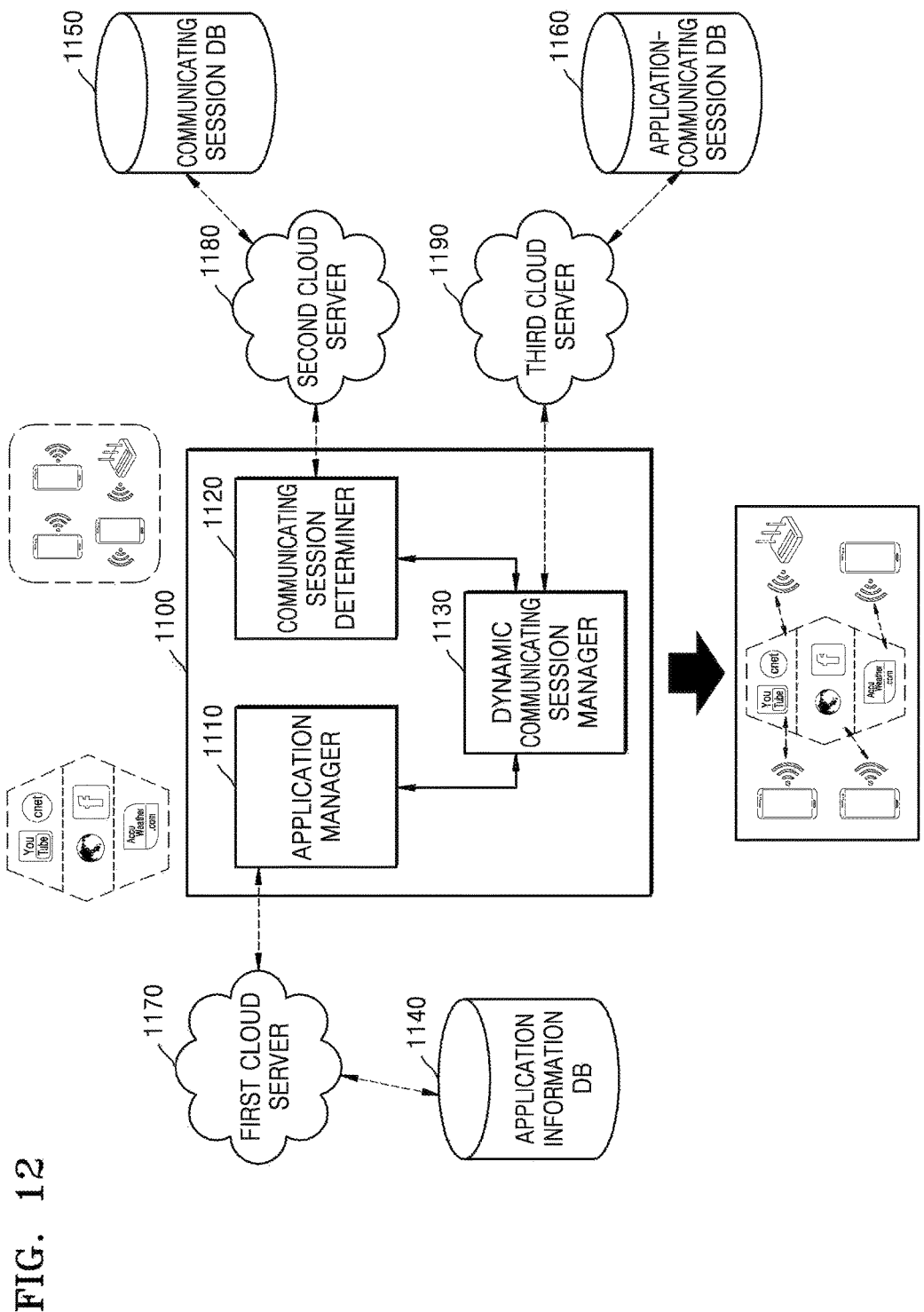

FIGS. 11 and 12 are schematic diagrams for explaining a method, performed by a device 1100, of allocating a communicating session to an application currently being executed on the device 1100, based on respective available bandwidths of a plurality of communicating sessions connected to the device 1100, according to another exemplary embodiment.

Referring to FIG. 11, the device 1100 may include an application manager 1110, a communicating session determiner 1120, and a dynamic communicating session manager 1130. However, all of the illustrated components are not essential. The device 1100 may be implemented by more or less components than those illustrated in FIGS. 11 and 12.

According to an exemplary embodiment, the application manager 1110 may generate an application information database (DB) 1140 which stores information about an application that is executed on the device 1100. The information about the application may include identification (ID) information of the application, information about whether a communicating session is to be allocated during execution of the application, and information about the strength of a required bandwidth of the application.

According to an exemplary embodiment, the application may be executed by other devices connectable to the device 1100.

Table 1 below shows required bandwidth strengths of applications stored in the application information DB 1140.

TABLE 1

<Information about required bandwidths of applications>

| Application | Category | Required bandwidth |
|---|---|---|
| APP1, APP3, APP8 and APP 10 | Video streaming (VOD Apps) | High |
| APP2 and APP4 | Web browser | Medium, Low |
| APP5 and APP7 | Weather information | Low |
| APP6 | SNS(Social Network Service) | Medium |
| APP9 | Search engine | Medium |

The information about the required bandwidths of the applications included in the application information DB 1140 may be updated every time a new application is executed.

The application information DB 1140 may be located outside the device 1100. However, this is only an exemplary embodiment, and the application information DB 1140 may be located inside the device 1100.

According to an exemplary embodiment, the communicating session determiner 1120 may include a module or hardware for identifying communicating sessions connected to the device 1100. The communicating session determiner 1120 may identify the communicating sessions connected to the device 1100, such as Bluetooth, Wi-Fi direct, DNLA/UnP, and alljoyn.

The communicating session determiner 1120 may generate a communicating session DB 1150 which stores information about communicating sessions connectable to the device 110. The information about the communicating sessions may include information about the strengths of bandwidths providable by the communicating sessions and information about priorities pre-set for the communicating sessions. When the strengths of respective available bandwidths of a plurality of communicating sessions exceed the strength of a required bandwidth of a currently-being-executed application, the information about the priorities may be used to determine one from among the plurality of communicating sessions. Table 2 below shows available bandwidth strengths of the communicating sessions stored in the communicating session DB 1150.

TABLE 2

<Information about available bandwidths of communicating sessions>

| Communicating device | Communicating session | Channel |
| --- | --- | --- |
| First device | 4G | Hot Spot |
| Second device | 3G | Hot Spot |
| Third device | 2G | Hot Spot |
| Fourth device (LAN) | 512 KBPS | Ethernet cable |

The communicating session DB 1150 may be located outside the device 1100. However, this is only an exemplary embodiment, and the communicating session DB 1150 may be located inside the device 1100.

According to an exemplary embodiment, the dynamic communicating session manager 1130 may allocate at least one communicating session to an application, based on the strength of the required bandwidth of an application determined by the application manager 1110 and the strength of the available bandwidth of a communicating session determined by the communicating session determiner 1120.

For example, to allocate at least one communicating session to an application, the dynamic communicating session manager 1130 may include a sub-component (hereinafter, a first sub-component) which searches for information about available communicating sessions, a sub-component (hereinafter, a second sub-component) which determines the strength of the available bandwidth of an actual communicating session, a sub-component (hereinafter, a third sub-component) which generates an application-communicating session mapping DB, and a sub-component (hereinafter, a fourth sub-component) which sets up and manages a virtual network.

According to an exemplary embodiment, the first sub-component may search for information about available communicating sessions. A plurality of communicating sessions connected to the device 1100 may provide different available bandwidths. The first sub-component may analyze the strengths of the available bandwidths of the communication sessions connectable to the device 1100 and thus may generate a DB.

TABLE 3

<Information about available bandwidths of communicating sessions>

| Communicating device | Communicating session | Sub-net | Available bandwidth |
| --- | --- | --- | --- |
| First device | 4G | 255.255.225.25 | High |
| Second device | 3G | 255.255.0.100 | High |
| Third device | 2G | 255.252.252.25 | Medium |
| LAN/Wi-Fi | 512 KBPS | 255.255.0.0 | Medium |

According to an exemplary embodiment, the second sub-component may analyze actually providable available bandwidths of the plurality of communicating sessions. For example, assuming that a communicating session provides a 4G bandwidth, the 4G bandwidth may be shared by a plurality of other devices already connected to the communicating device via hot spot. In this case, an actual available bandwidth of communicating device may be lower than a determined available bandwidth. Accordingly, the second sub-component may generate a DB of available bandwidths actually providable by the device 1100.

Various available bandwidths may be provided for various communicating sessions. For example, the device 1100 may determine how many bits are to be transmitted via a communicating session, and thus determine the available bandwidth of the communicating session. The strengths of available bandwidths actually providable by the device 1100 can be calculated using different mechanisms. Few of the mechanisms are mentioned below:

1. Actual Available Bandwidth=Available Bandwidth Strength / Already Existing Connections Count
2. Actual Available Bandwidth=Available Bandwidth/Number of Applications connected
3. Actual Available Bandwidth=Actual Bandwidth−Consumed data per second by existing connections or apps.

In above table, it can be seen that the second device and the third device have actually-providable bandwidth strengths lower than their available bandwidth strengths. This may be because of the already existing connections with these devices or may be because of the applications currently being executed on these devices.

TABLE 4

<Information about actual available bandwidths of communicating sessions>

| Communicating device | Communicating session | Sub-net | Available bandwidth | Actual available bandwidth |
| --- | --- | --- | --- | --- |
| First device | 4G | 255.255.225.25 | High | High |
| Second device | 3G | 255.255.0.100 | High | Medium |
| Third device | 2G | 255.252.252.25 | Medium | Low |
| LAN/Wi-Fi | 512 KBPS | 255.255.0.0 | Medium | Medium |

According to an exemplary embodiment, the third sub-component may generate an application-communicating session DB 1160 which stores information about the at least one communicating session allocated to the application. A method, performed by the third sub-component, of allocating a communicating session to an application may correspond to the method described above with reference to FIG. 2.

TABLE 5

<Information about mapping between communicating devices and applications>

| Application | Type | Required bandwidth | Recommended communicating device |
|---|---|---|---|
| ESPN | Sports | Medium | First device, Second device, Wi-Fi |
| Netflix | HD - VOD | High | First device, Wi-Fi |
| Basket Balls | Online Game | Medium | First device, Second device, Wi-Fi |
| YouTube | Video Streaming | High | First device, Wi-Fi |
| Facebook | SNS | Low | Third device |
| Accu Weather | Utility App | Low | Third device |
| Browser | Browser | Medium, Low | First device, Second device, Third device, Wi-Fi |

Table below shows information about communicating sessions allocated to the applications stored in the communicating session DB 1150.

TABLE 6

<Information about mapping between communicating sessions and applications>

| Application | Required bandwidth | Recommended communicating device | Communicating session |
|---|---|---|---|
| APP1, APP3, APP8 and APP 10 | High | First device, Second device | 4G, 3G |
| APP2 and APP4 | Medium | Second device, Fourth device | 3G, 512 Kbps |
| APP5 and APP7 | Low | Third device | 2G |
| APP6 | Medium | Third device | 3G |
| APP9 | Medium | Third device | 3G |

The application-communicating session DB 1160 may be located outside the device 1100. However, this is only an exemplary embodiment, and the application-communicating session DB 1160 may be located inside the device 1100.

The fourth sub-component may set a virtual network and manage the set virtual network. According to an exemplary embodiment, the fourth sub-component may set a virtual IP address to the application, based on information about the communicating session allocated to the application. For example, the fourth sub-component may generate a plurality of virtual IP addresses, based on a communicating session allocated to each of a plurality of applications. Via the virtual IP addresses, the fourth sub-component may allocate a communicating session allocated to each of a plurality of applications that are being currently executed.

A virtual IP address (VIP or VIPA) may be assigned to each of the plurality of applications. Incoming traffic is the VIP addresses which are routed to actual network interfaces. A server IP address depends on the MAC address of an attached network interface card (NIC), and only one logical IP address may be assigned per card. However, the fourth sub-component may allocate different communicating sessions to different applications by using the VIP addresses. VIPs may be determined according to, for example, a Common Address Redundancy Protocol (CARP) and a Proxy Address Resolution Protocol (ARP).

An NIC allocates an IP address to a TCP/IP network. Using virtual IP addresses, a single NIC may communicate via multiple addresses using ifconfig linux command. For example, an existing interface eth0 may use a port 192.168.128.114 as follows.

saturn# ifconfig eth0
eth0 Link encap:Ethernet HWaddr 08:00:27:ce:5f:8e
inet addr:192.168.128.114 Bcast:192.168.128.255 Mask: 255.255.255.0
inet6 addr: fe80::a00:27ff:fece:5f8e/64 Scope:Link
UP BROADCAST RUNNING MULTICAST MTU:1500 Metric:1
RX packets:10057681 errors:0 dropped:0 overruns:0 frame:0
TX packets:8902384 errors:0 dropped:0 overruns:0 carrier:0
collisions:0 txqueuelen:1000
RX bytes:6941125495 (6.9 GB) TX bytes:6305062533 (6.3 GB)

Using Iconfig command, the interface eth0 may be allowed to receive traffic via another port 192.168.128.130. This command tells the TCP/IP stack of a linux operating system to receive packets directed to the other port 192.168.128.130 as well as the original port 192.168.128.114.

According to an exemplary embodiment, referring to FIG. 12, the application manager 1110, the communicating session determiner 1120, and the dynamic communicating session manager 1130 may respectively generate the application information DB 1140, the communicating session DB 1150, and the application-communicating session DB 1160 via first, second, and third cloud servers 1170, 1180, and 1190. For example, the application manager 1110 may generate the application information DB 1140 which stores information about an application, via the first cloud server 1170.

According to an exemplary embodiment, because processing in a large capacity DB may be delayed according to hardware specifications of a device, the device 1100 may store the application information DB 1140 in the first cloud server 1170.

As another example, the communicating session determiner 1120 may generate the communicating session DB 1150 which store information about communicating sessions, via the second cloud server 1180. As another example, the dynamic communicating session determiner 1130 may generate the application-communicating session DB 1160 which store information about communicating sessions that are allocated to applications, via the third cloud server 1190.

Figure 13:
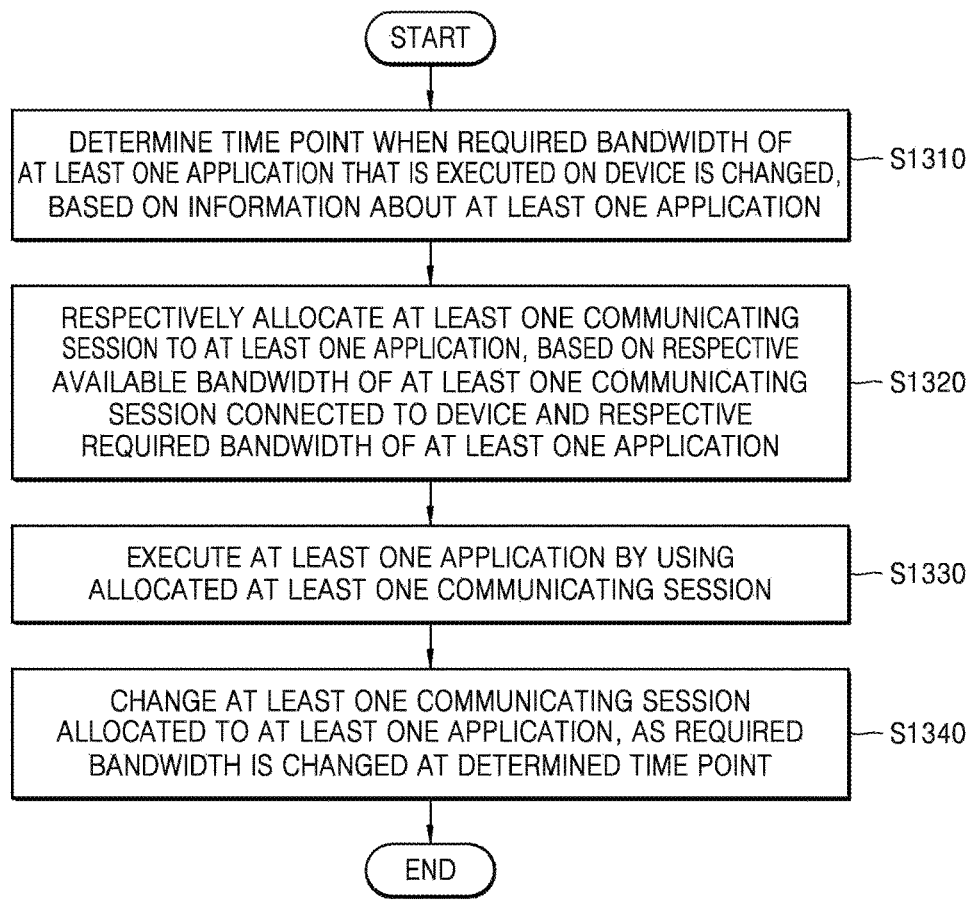
FIG. 13 is a flowchart of a method, performed by a device, of changing a communicating session that is allocated to an application according to the time point when a required bandwidth of the application is changed, according to an exemplary embodiment.

FIG. 13 is a flowchart of a method, performed by a device, of changing a communicating session that is allocated to an application according to the time point when a required bandwidth of the application is changed, according to an exemplary embodiment.

In operation S1310, the device may determine a time point when a required bandwidth of at least one application that is executed on the device is changed, based on information about the at least one application. For example, the device may determine the time point when a required bandwidth of an application is changed, based on information about the time point when the required bandwidth of the application is changed, which is pre-stored in metadata of the application.

However, the disclosure of FIG. 13 is only an exemplary embodiment, and the device may receive information informing that the required bandwidth of the application has been changed, from an application providing server while executing the application. The device may determine the strength of the changed required bandwidth, based on the received information. Thus, when the strength of the required bandwidth of the application is changed in real time, the device may allocate a communicating session to the application in consideration of the change in the strength of the required bandwidth.

In operation S1320, the device may respectively allocate at least one communicating session to the at least one application, based on a respective available bandwidth of at least one communicating session connected to the device and a respective required bandwidth of the at least one application.

In operation S1330, the device may execute the at least one application by using the allocated at least one communicating session.

In operation S1340, the device may change the at least one communicating session allocated to the at least one application, as the required bandwidth is changed at the determined time point.

Figure 14:
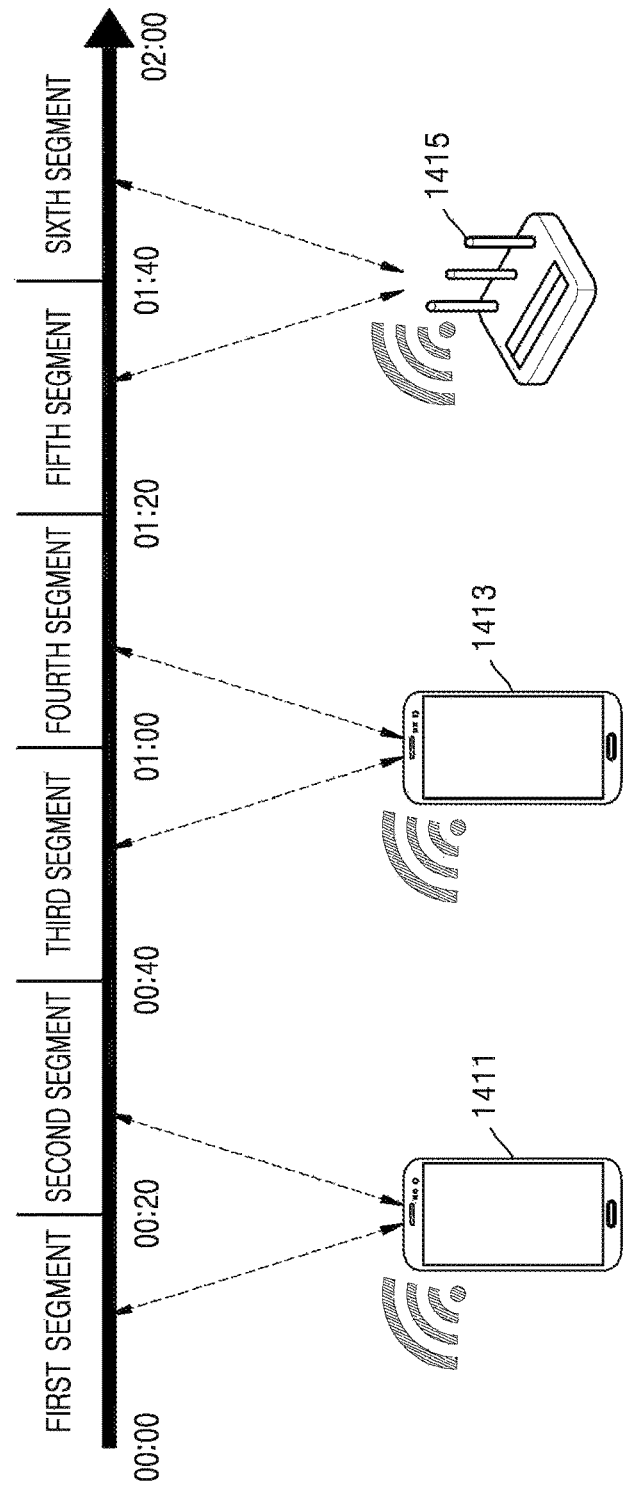
FIG. 14 is a schematic diagram for explaining a method, performed by a device, of changing a communicating session that is allocated to an application according to the time point when a required bandwidth of the application is changed, according to an exemplary embodiment.

FIG. 14 is a schematic diagram for explaining a method, performed by a device, of changing a communicating session that is allocated to an application according to time points when an available bandwidth of a communicating session allocated to a video application changes, according to an exemplary embodiment.

According to an exemplary embodiment, the device may execute a video application. The device may receive video content in units of segments via the currently-being-executed video application.

Referring to FIG. 14, during a time interval between 0 minutes (00:00) and 40 minutes (00:40) when a first segment and a second segment are received, the device may allocate a communicating session of a first communicating device 1411 to the video application. It is assumed that an available bandwidth of the first communicating device 1411 exceeds a bandwidth required to receive the first segment and the second segment during the time interval between 00:00 and 00:40.

During a time interval between 00:40 and 1:20 when a third segment and a fourth segment are received, the device may allocate a communicating session of a second communicating device 1413 to the video application. It is assumed that the available bandwidth of the first communicating device 1411 is less than or equal to a bandwidth required to receive the third segment and the fourth segment during the time interval between 00:40 and 01:20. It is assumed that an available bandwidth of the second communicating device 1413 exceeds the bandwidth required to receive the third segment and the fourth segment during the time interval between 00:40 and 01:20.

During a time interval between 01:20 and 02:00 when a fifth segment and a sixth segment are received, the device may allocate a communicating session of a third communicating device 1415 to the video application. It is assumed that the available bandwidths of the first and second communicating devices 1411 and 1413 are less than or equal to a bandwidth required to receive the fifth segment and the sixth segment during the time interval between 01:20 and 02:00. It is assumed that an available bandwidth of the third communicating device 1415 exceeds the bandwidth required to receive the first segment and the second segment during the time interval between 01:20 and 02:00.

Figure 15:
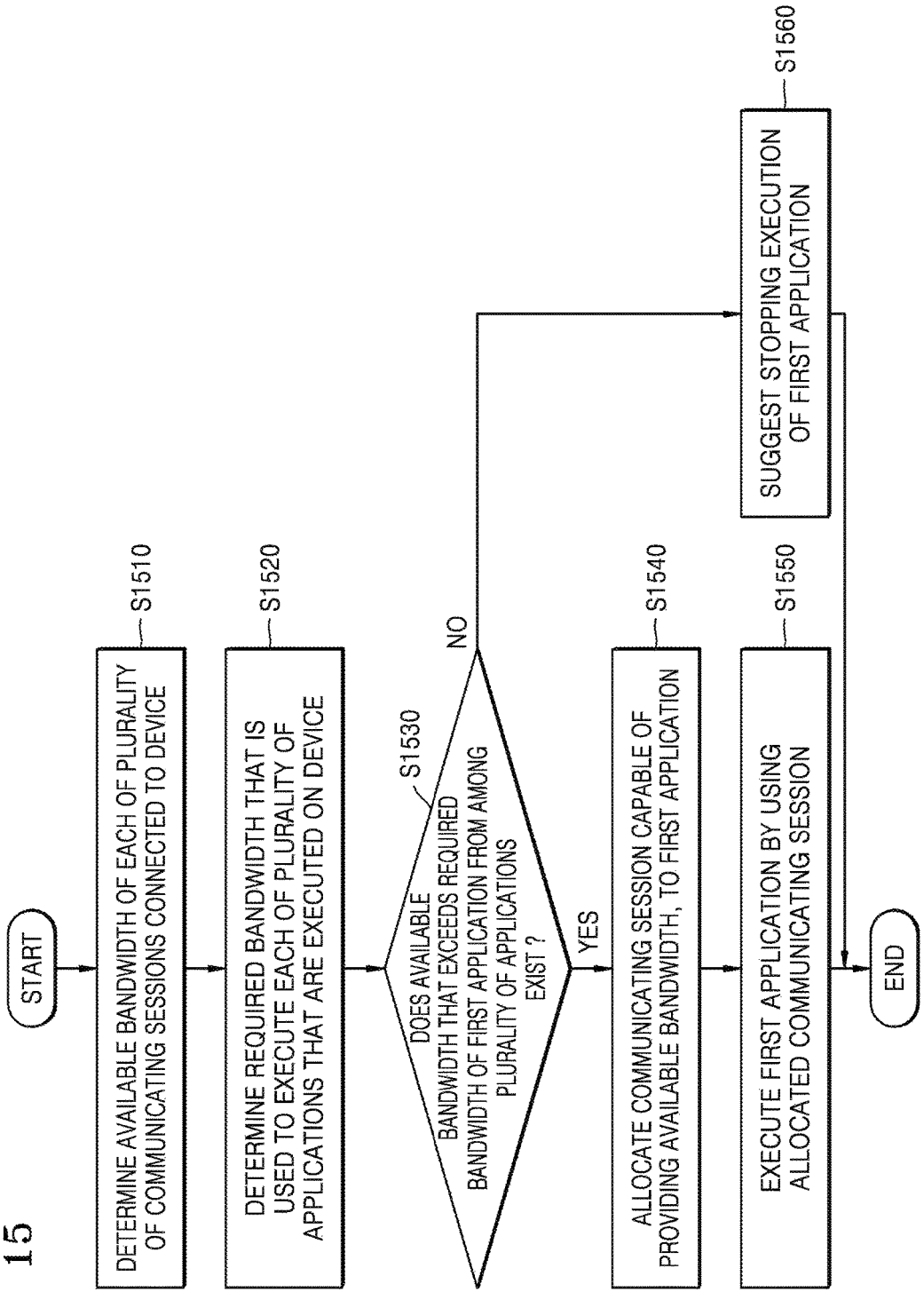
FIG. 15 is a flowchart of a method, performed by a device, of allocating at least one communicating session to each of a plurality of applications, based on an available bandwidth of each of a plurality of communicating sessions connected to the device and a required bandwidth of each of the plurality of applications, according to an exemplary embodiment.

FIG. 15 is a flowchart of a method, performed by a device, of allocating at least one communicating session to each of a plurality of applications, based on an available bandwidth of each of a plurality of communicating sessions connected to the device and a required bandwidth of each of the plurality of applications, according to an exemplary embodiment.

In operation S1510, the device may determine the available bandwidth of each of the plurality of communicating sessions connected to the device.

Operation S1510 may correspond to operation S210 described above with reference to FIG. 2.

In operation S1520, the device may determine a required bandwidth that is used to execute each of the plurality of applications, which are executed on the device.

Operation S1520 may correspond to operation S220 described above with reference to FIG. 2.

In operation S1530, the device may determine whether there exists an available bandwidth that exceeds a required bandwidth of a first application from among the plurality of applications. According to an exemplary embodiment, the device may select a communicating session of which an available bandwidth exceeds the required bandwidth of the first application, from among the plurality of communicating sessions.

When at least two communicating sessions from among the plurality of communicating sessions are capable of provide an available bandwidth that exceed the required bandwidth of the first application, the device may select the communicating session that is allocated to the first application, based on priorities respectively pre-set for the plurality of communicating sessions.

In operation S1540, the device may allocate a communicating session capable of providing the available bandwidth, to the first application.

In operation S1550, the device may execute the first application by using the allocated communicating session.

In operation S1560, the device may suggest stopping the execution of the first application.

According to an exemplary embodiment, as the required bandwidth of the first application exceeds the available bandwidth of each of the plurality of communicating sessions, the device may display a message suggesting that the execution of the first application is stopped.

However, this is only an exemplary embodiment, and, according to an exemplary embodiment, the device may suggest another application except for the first application. For example, when a user searches for a web site to check the scores of a football game, the device may suggest a web site that requires a smaller strength bandwidth than that required by a web site found by the user. As another example, when a user selects a VOD application that streams a football game video, the device may suggest a different type of application from the VOD application or suggest that the quality of a video is changed to a low quality.

Figure 16:
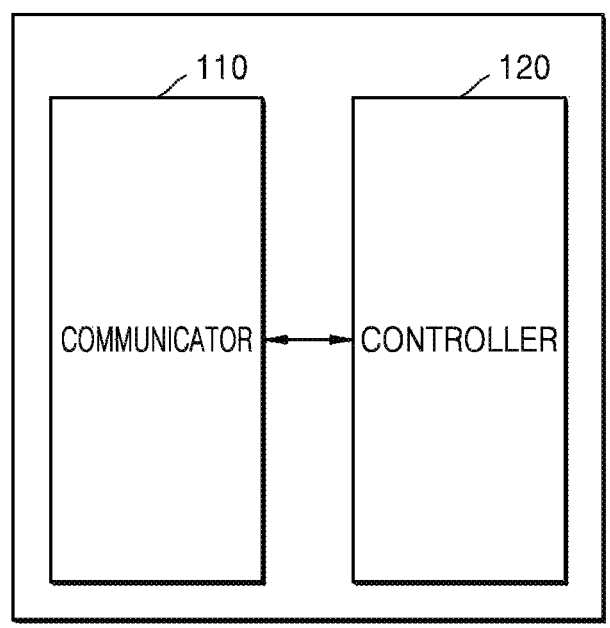
FIGS. 16 and 17 are block diagrams of a device according to an exemplary embodiment.
Figure 17:
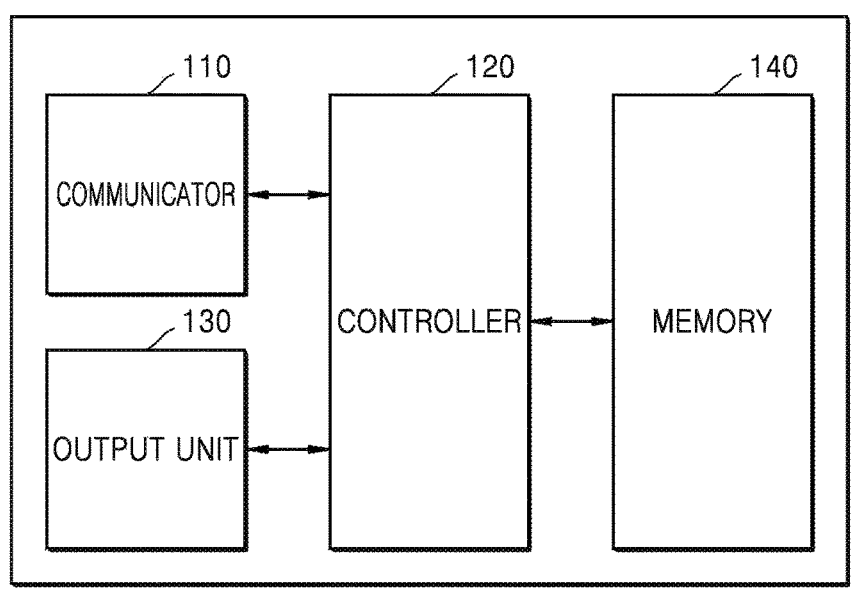

FIGS. 16 and 17 are block diagrams of a device 100 according to an exemplary embodiment.

Referring to FIG. 16, the device 100 may include a communicator 110 and a controller 120. However, all of the illustrated components are not essential. The device 100 may be implemented by more or less components than those illustrated in FIGS. 16 and 17.

For example, the device 100 may further include an output unit 130 and a memory 140 in addition to the communicator 110 and the controller 120.

The aforementioned components will now be described in detail.

The communicator 110 may set paired devices and at least one communicating session. For example, the communicator 110 may set at least one communicating device and at least one communicating session capable of providing a bandwidth to the device 100.

The communicator 110 may include at least one component that enables communication between the device 100 and the paired devices. The paired devices may include, for example, a communicating device and an application providing server. For example, the communicator 110 may include a short-range wireless communication unit, a mobile communication unit, and a broadcasting reception unit.

The short-range wireless communication unit may include, but is not limited to, a Bluetooth communicator, a Bluetooth Low Energy (BLE) communicator, a near field communication (NFC) unit, a wireless local area network (WLAN) (e.g., Wi-Fi) communicator, a ZigBee communicator, an infrared Data Association (IrDA) communicator, a Wi-Fi direct (WFD) communicator, an ultra wideband (UWB) communicator, an Ant+ communicator, and the like.

The mobile communication unit may exchange a wireless signal with at least one selected from a base station, an external terminal, and a server on a mobile communication network. Examples of the wireless signal may include a voice call signal, a video call signal, and various types of data generated during a short message service (SMS)/multimedia messaging service (MMS).

The broadcasting reception unit receives a broadcasting signal and/or broadcasting-related information from an external source via a broadcasting channel. The broadcasting channel may be a satellite channel, a ground wave channel, or the like. According to exemplary embodiments, the device 100 may not include the broadcasting reception unit.

The controller 120 typically controls all operations of the device 100. For example, the controller 120 may control the communicator 110 and the output unit 130, and the like by executing the programs stored in the memory 140.

The controller 120 may determine an available bandwidth of a communicating session that is provided by at least one paired device. The controller 120 determines a required bandwidth that is used to execute each of a plurality of applications that are executed on the device 100. The controller 120 may allocate at least one communicating session to at least one application, based on the strengths of the respective available bandwidths of the plurality of communicating sessions and the strengths of the respective required bandwidths of the plurality of applications. The controller 120 may execute the at least one application by using the allocated at least one communicating session.

According to an exemplary embodiment, the controller 120 may allocate a first communicating session to a first application from among the plurality of applications, based on the strengths of the respective available bandwidths of the plurality of communicating sessions and the strengths of the respective required bandwidths of the plurality of applications.

According to an exemplary embodiment, the controller 120 may classify the plurality of applications into at least one group, based on the respective required bandwidths of the plurality of applications. The controller 120 may allocate at least one communicating session to each group.

According to an exemplary embodiment, when the required bandwidth of each application changes according to a change in the amount of data transmitted or received, the controller 120 may change a communicating session allocated to each application. The controller 120 may update the available bandwidths, based on status information about the at least one communicating session. The controller 120 may change the communicating session allocated to each application, according to updates of the available bandwidth strengths.

According to an exemplary embodiment, the controller 120 may determine the strength of an actual available bandwidth, based on information about the strength of a bandwidth allocated to the paired device with respect to a communicating session connected to the device 100). The strength of the actual available bandwidth may be determined based on the strengths of bandwidths providable by the plurality of communicating sessions and the strength of the bandwidth allocated to the paired device.

According to an exemplary embodiment, the controller 120 may allocate at least two communicating sessions that provide available bandwidths with different strengths, to at least one of the plurality of applications.

When the strength of a required bandwidth of a first application from among the at least one application exceeds the strength of an available bandwidth of a communicating session allocated to the first application, the output unit 130 may provide information about the first application.

The memory 140 may store a program for processing and control by the controller 120, or may store input/output data.

The memory 140 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk. The device 100 may operate a web storage or a cloud server on the internet which performs a storage function of the memory 140.

A method according to an exemplary embodiment may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for exemplary embodiments of the present invention or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

The apparatuses described herein may comprise a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., read-only memory (ROM), random-access memory (RAM), floppy disks, hard disks, etc.), and optical recording media (e.g., CD-ROMs, or Digital Versatile Discs (DVDs)). The computer readable recording medium can also be distributed over network coupled computer systems so that the computer readable code is stored and executed in a distributive manner. This media can be read by the computer, stored in the memory, and executed by the processor.

Reference has been made to the exemplary embodiments illustrated in the drawings, and specific language has been used to describe the exemplary embodiments. However, no limitation of the scope of the inventive concept is intended by this specific language, and exemplary embodiments should be construed to encompass all exemplary embodiments that would normally occur to one of ordinary skill in the art.

Exemplary embodiments may be described in terms of functional block components and various processing steps. Such functional blocks may be realized by any number of hardware and/or software components configured to perform the specified functions. For example, exemplary embodiments may employ various integrated circuit (IC) components, e.g., memory elements, processing elements, logic elements, look-up tables, and the like, which may carry out a variety of functions under the control of one or more microprocessors or other control devices. Exemplary embodiments may also employ cores of the same kind or different kinds, different kinds of CPUs, etc. Similarly, where the elements are implemented using software programming or software elements, the exemplary embodiments described herein may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the exemplary embodiments described herein could employ any number of conventional techniques for electronics configuration, signal processing and/or control, data processing and the like. The words "mechanism," "element," "means," and "configuration" are used broadly and are not limited to mechanical or physical exemplary embodiments, but can include software routines in conjunction with processors, etc.

The particular implementations shown and described herein are illustrative exemplary embodiments and are not intended to otherwise limit the scope of exemplary embodiments in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus. Moreover, no item or component is essential to the practice of the inventive concept unless the element is specifically described as "essential" or "critical".

The use of the terms "a" and "an" and "the" and similar referents in the context of the description of the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. Exemplary embodiments of the present invention are not limited to the described order of the operations. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope.

The exemplary embodiments should be considered in descriptive sense only and not for purposes of limitation. Descriptions of features or aspects within each exemplary embodiment should typically be considered as available for other similar features or aspects in other exemplary embodiments.

While exemplary embodiments have been particularly shown and described above, it will be understood by those of ordinary skill in the art that various changes in form and details may be made therein without departing from the spirit and scope of the inventive concept as defined by the following claims.

What is claimed is:

1. A method of setting a communicating session for executing an application of a first device, by the first device, the method comprising:
    detecting respective available bandwidths of a plurality of communicating sessions connected to the first device;
    determining respective required bandwidths to execute a plurality of applications executed on the first device;
    allocating at least one communicating session of the plurality of communicating sessions to at least one application of the plurality of applications based on a size of the respective available bandwidths of the plurality of communicating sessions and a size of the required bandwidth of the at least one application;
    assigning a virtual IP address for the at least one application based on the allocating the at least one communicating session; and
    executing the at least one application using the allocated at least one communicating session and the assigned virtual IP address.

2. The method of claim 1, wherein the allocating comprises allocating a first communicating session of the plurality of communicating sessions to a first application from among the plurality of applications, based on the size of the respective available bandwidths of the plurality of communicating sessions and the size of the respective required bandwidths of the plurality of applications, and
    wherein an available bandwidth of the first communicating session exceeds a required bandwidth of the first application.

3. The method of claim 1, further comprising classifying the plurality of applications into one or more groups, based on the respective required bandwidths of the plurality of applications,
    wherein the allocating comprises allocating the at least one communicating session to a respective group into which the at least one application is classified.

4. The method of claim 1, wherein the respective required bandwidth is determined based on an amount of data that is transmitted or received during execution of each of the plurality of applications, and
    wherein the method further comprises changing the at least one communicating session allocated to the at least one application to another one of the plurality of communicating sessions, when the respective required bandwidths of the plurality of applications change based on a change in the amount of data transmitted or received by each of the plurality of applications.

5. The method of claim 1, further comprising:
updating a size of an available bandwidth of the at least one communicating session, based on status information about the at least one communicating session; and
changing the at least one communicating session allocated to the at least one application to another one of the plurality of communicating sessions, according to the updated size of the available bandwidth.

6. The method of claim 1, further comprising acquiring information about a size of a bandwidth allocated to at least one application executed in a second device from the at least one communicating session,
wherein the available bandwidth of the at least one communicating session is determined based on a size of bandwidth providable by the at least one communicating session and the size of the bandwidth allocated to the at least one application executed in the second device.

7. The method of claim 1, wherein the allocating comprises allocating at least two communicating sessions of the plurality of communicating sessions that provide available bandwidths with different sizes, to the at least one application.

8. The method of claim 1, wherein the required bandwidths of the at least one application are determined based on information about a predetermined bandwidths used by the first device to execute the at least one application.

9. The method of claim 1, wherein the determining the required bandwidths further comprises acquiring information about the required bandwidths from a server.

10. A non-transitory computer-readable recording medium having recorded thereon a program for executing the method of claim 1.

11. A device for setting a communicating session for executing an application of the device, the device comprising:
a communication port configured to set up at least one communicating session via at least one second paired device; and
a processor configured to detect respective available bandwidths of a plurality of communicating sessions, to determine respective required bandwidths to execute each of a plurality of applications on the device, to allocate at least one communicating session of the plurality of communicating sessions to at least one application of the plurality of applications based on a size of the respective available bandwidths of the plurality of communicating sessions and a size of the respective required bandwidths of the at least one application, to assign a virtual IP address for the at least one application based on the allocation, and to execute the at least one application using the allocated at least one communicating session and the assigned virtual IP address.

12. The device of claim 11, wherein the processor is further configured to allocate a first communicating session of the plurality of communicating sessions to a first application from among the plurality of applications, based on the size of the respective available bandwidths of the plurality of communicating sessions and a size of the respective required bandwidths of the plurality of applications, and
wherein a size of available bandwidth of the first communicating session exceeds a size of required bandwidth of the first application.

13. The device of claim 11, wherein the processor is configured to classify the plurality of applications into one or more groups, based on the respective required bandwidths of the plurality of applications, and allocates the at least one communicating session to a respective group into which the at least one application is classified.

14. The device of claim 11, wherein the respective required bandwidth is determined based on an amount of data that is transmitted or received during execution of each of the plurality of applications, and
wherein the processor is configured to change the at least one communicating session allocated to the at least one application to another one of the plurality of communicating sessions in response to the respective required bandwidths of the plurality of applications changing based on a change in the amount of data transmitted or received by each of the plurality of applications.

15. The device of claim 11, wherein the processor is configured to update a size of an available bandwidth of the at least one communicating session, based on status information about the at least one communicating session and
wherein the processor is configured to change the at least one communicating session allocated to the at least one application to another one of the plurality of communicating sessions, according to the updated size of the available bandwidth.

16. The device of claim 11, wherein the communication port is configured to acquire information about a size of bandwidth allocated to at least one application executed in a second device from the at least one communicating session, and
wherein the available bandwidth of the at least one communicating session is determined based on a size of bandwidth providable by the at least one communicating session and the size of the bandwidth allocated to the at least one application executed in the second device.

17. The device of claim 11, wherein the processor is configured to allocate at least two communicating sessions of the plurality of communicating sessions that provide respective available bandwidths with different sizes, to the at least one application.

18. The device of claim 11, wherein the required bandwidths of the at least one application are determined based on information about predetermined bandwidths used by the device to execute the at least one application.

19. The device of claim 11, wherein the communication port is configured to acquire information about the required bandwidths from a server.

* * * * *